US007976789B2

(12) United States Patent
Kenis et al.

(10) Patent No.: US 7,976,789 B2
(45) Date of Patent: Jul. 12, 2011

(54) MICROFLUIDIC DEVICE FOR PREPARING MIXTURES

(75) Inventors: Paul J. A. Kenis, Champaign, IL (US); Joshua D. Tice, Urbana, IL (US); Sarah L. Perry, Champaign, IL (US); Griffin W. Roberts, Lawrence, KS (US)

(73) Assignee: The Board of Trustees of the University of Illinois, Urbana, IL (US)

(*) Notice: Subject to any disclaimer, the term of this patent is extended or adjusted under 35 U.S.C. 154(b) by 3 days.

(21) Appl. No.: 12/177,828

(22) Filed: Jul. 22, 2008

(65) Prior Publication Data

US 2010/0022007 A1 Jan. 28, 2010

(51) Int. Cl.
*B01D 9/00* (2006.01)

(52) U.S. Cl. .................... 422/245.1; 422/68.1; 422/408; 422/417; 422/600; 422/606; 422/500; 422/501; 422/502; 422/504; 422/537

(58) Field of Classification Search ................ 422/68.1, 422/81, 245.1; 435/286.5, 287.2
See application file for complete search history.

(56) References Cited

U.S. PATENT DOCUMENTS 5,856,174 A * 1/1999 Lipshutz et al. ........... 435/286.5
6,408,878 B2 6/2002 Unger et al.
6,409,832 B2 * 6/2002 Weigl et al. ................... 117/206
6,719,840 B2 * 4/2004 David et al. ................ 422/245.1
6,761,766 B2 7/2004 David
6,793,753 B2 9/2004 Unger et al.
6,843,262 B2 1/2005 Ismagilov et al.
6,899,137 B2 5/2005 Unger et al.
6,929,030 B2 8/2005 Unger et al.
6,951,632 B2 10/2005 Unger et al.
7,040,338 B2 5/2006 Unger et al.
7,052,545 B2 5/2006 Quake et al.
7,118,626 B2 10/2006 Ng et al.
7,144,616 B1 12/2006 Unger et al.
7,169,314 B2 1/2007 Unger et al.
7,195,670 B2 3/2007 Hansen et al.
7,216,671 B2 5/2007 Unger et al.
7,217,321 B2 * 5/2007 Hansen et al. .................. 117/68
7,494,555 B2 2/2009 Unger et al.
2005/0041525 A1 2/2005 Pugia et al.
2005/0226742 A1 * 10/2005 Unger et al. .................. 417/412
2006/0280029 A1 12/2006 Garstecki et al.
2007/0119510 A1 5/2007 Kartalov et al.
2007/0189927 A1 * 8/2007 Ballhorn et al. ............. 422/68.1

OTHER PUBLICATIONS

Yang et al. (J Micromech, Microeng. 14 (2004) 1345-1351).*
Landau, E.M. et al., "Lipidic cubic phases: A novel concept for the crystallization of membrane proteins", Proc. Natl. Acad. Sci. USA, vol. 93, pp. 14532-14535, 1996.

(Continued)

*Primary Examiner* — Sally A Sakelaris
(74) *Attorney, Agent, or Firm* — Evan Law Group LLC

(57) ABSTRACT

A microfluidic device for preparing a mixture, has a mixer. The mixer includes a plurality of chambers, each chamber having a volume of at most 1 microliter, a first plurality of channels, each channel fluidly connecting 2 chambers, a plurality of chamber valves, each chamber valve controlling fluid flow out of one of the plurality of chambers, and a first plurality of channel valves, each channel valve controlling fluid flow through one of the first plurality of channels.

13 Claims, 14 Drawing Sheets

OTHER PUBLICATIONS

Quick, M., et al., "Monitoring the function of membrane transport proteins in detergent-solubilized form", Proc. Natl. Acad. Sci. USA, vol. 104, No. 9, pp. 3603-3608, 2007.
Li, L. et al., "Nanoliter microfluidic hybrid method for simultaneous screening and optimization validated with crystallization of membrane proteins", Proc. Natl. Acad. Sci. USA, vol. 103, No. 51, pp. 19243-19248, 2006.
Rummel, G. et al., "Lipidic Cubic Phases: New Matrices for the Three-Dimensional Crystallization of Membrane Proteins", Journal of Structural Biology, 121, pp. 82-91, 1998.
RCSB Protein Data Bank, http://www.rcsb.org/, 2 pages, 2009.
Membrane Proteins of Known 3D Structure. http://blanco.biomol.uci.edu/Membrane_Proteins_xtal.html, 27 pages, 2007.
Hansen, C.L. et al., "A robust and scalable microfluidic metering method that allows protein crystal growth by free interface diffusion", Proc. Natl. Acad. Sci. USA, vol. 99, No. 26, pp. 16531-16536, 2002.
Sommer, M.O. et al., "Crystallizing proteins on the basis of their precipitation diagram determined using a microfluidic formulator", J Synchrotron Rad., 12, pp. 779-785, 2005.
Briggs et al., "The Temperature-Composition Phase Diagram and Mesophase Structure Characterization of the Monoolein/Water System," J. Phys. II, 6, pp. 723-751, 1996.
Cherezov, V. et al., "Crystallization Screens: Compatibility with the Lipidic Cubic Phase for in Meso Crystallization of Membrane Proteins", Biophysical Journal, vol. 81, pp. 225-242, 2001.
Grabe, M. et al., "Protein Interactions and Membrane Geometry", Biophysical Journal, vol. 84, pp. 854-868, 2003.
Nollert, P. "Lipidic cubic phases as matrices for membrane protein crystallization", Methods, 34, pp. 348-353, 2004.
Caffrey, M., "Membrane protein crystallization", Journal of Structural Biology, 142, pp. 108-132, 2003.
Cheng, A.H. et al., "A simple mechanical mixer for small viscous lipid-containing samples", Chemistry and Physics of Lipids, 95, pp. 11-21, 1998.
Bonacucina, G. et al., "Rheological and Dielectric Characterization of Monoolein/Water Mesophases in the Presence of a Peptide Drug", Journal of Pharmaceutical Sciences, vol. 94, No. 11, pp. 2452-2462, 2005.
Mezzenga, R. et al., "Shear Rheology of Lyotropic Liquid Crystals: A Case Study", Langmuir, 21, pp. 3322-3333, 2005.
Hansen, C.L. et al., "Systematic investigation of protein phase behavior with a microfluidic formulator", Proc. Natl. Acad. Sci. USA, vol. 101, No. 40, pp. 14431-14436, 2004.
Stroock, A.D. et al. "Chaotic Mixer for Microchannels", Science, 295, pp. 647-651, 2002.
Squires, T.M. et al., "Microfluidics: fluid physics at the nanoliter scale" Reviews of Modern Physics, vol. 77, pp. 977-1026, 2005.
Chou, H.P. et al., "A Microfabricated Rotary Pump" Biomedical Microdevices, 3:4, pp. 323-330, 2001.
Shim, J.-uk. et al., "Control and Measurement of the Phase Behavior of Aqueous Solutions Using Microfluidics", J. Am. Chem. Soc., 129, pp. 8825-8835, 2007.
Cherezov, V. et al., "A simple and inexpensive nanoliter-volume dispenser for highly viscous materials used in membrane protein crystallization" Journal of Applied Crystallography, 38, pp. 398-400, 2005.
Cherezov, V. et al., "Nano-volume plates with excellent optical properties for fast, inexpensive crystallization screening of membrane proteins", Journal of Applied Crystallography, 36, pp. 1372-1377, 2003.
Cherezov, V. et al., "Picolitre-scale crystallization of membrane proteins", Journal of Applied Crystallography, 39, pp. 604-606, 2006.
Unger, M.A. et al., "Monolithic Microfabricated Valves and Pumps by Multilayer Soft Lithography", Science, 288, pp. 113-116, 2000.
Zhou, X. et al., "Nanoliter Dispensing Method by Degassed Poly(dimethylsiloxane) Microchannels and Its Application in Protein Crystallization", Anal. Chem., vol. 79, No. 13, pp. 4924-4930, 2007.
Hansen, C.L. et al., "A Microfluidic Device for Kinetic Optimization of Protein Crystallization and In Situ Structure Determination", J. Am. Chem. Soc., 128, pp. 3142-3143, 2006.
Garcia-Ruiz, J.M. et al., "A supersaturation wave of protein crystallization", Journal of Crystal Growth, 232, pp. 149-155, 2001.
Garcia-Ruiz, J.M. et al., "Granada Crystallisation Box: a new device for protein crystallisation by counter-diffusion techniques", Acta Cryst. D58, pp. 1638-1642, 2002.
Gavira, J.A. et al. "Ab initio crystallographic structure determination of insulin from protein to electron density without crystal handling", Acta Cryst., D58, pp. 1147-1154, 2002.
Ng, J.D. et al., "Protein crystallization by capillary counterdiffusion for applied crystallographic structure determination", Journal of Structural Biology, 142, pp. 218-231, 2003.
López-Jaramillo, F.J. et al., "Crystallization and cryocrystallography inside x-ray capillaries", J. Appl. Cryst., 34, pp. 365-370, 2001.
Chen, D.L. et al., "Using Microfluidics to Observe the Effect of Mixing on Nucleation of Protein Crystals", J. Am. Chem. Soc., 127, pp. 9672-9673, 2005.
Zheng, B. et al., "Using nanoliter plugs in microfluidics to facilitate and understand protein crystallization", Current Opinion in Structural Biology, 15, pp. 548-555, 2005.
Zheng, B. et al., "A Microfluidic Approach for Screening Submicroliter Volumes against Multiple Reagents by Using Preformed Arrays of Nanoliter Plugs in a Three-Phase Liquid/Liquid/Gas Flow", Angew. Chem. Int. Ed., 44, pp. 2520-2523, 2005.
Zheng, B. et al., "Screening of Protein Crystallization Conditions on a Microfluidic Chip Using Nanoliter-Size Droplets", J. Am. Chem. Soc., 125, pp. 11170-11171, 2003.
Zheng, B. et al., "A Droplet-Based, Composite PDMS/Glass Capillary Microfluidic System for Evaluating Protein Crystallization Conditions by Microbatch and Vapor-Diffusion Methods with On-Chip X-Ray Diffraction", Angew. Chem. Int. Ed., 43, pp. 2508-2511, 2004.
Yadav, M. et al., "In situ data collection and structure refinement from microcapillary protein crystallization" J. Appl. Cryst., 38, pp. 900-905, 2005.
Gerdts, C.J. et al., "Time-Controlled Microfluidic Seeding in nL-Volume Droplets to Separate Nucleation and Growth Stages of Protein Crystallization", Angew. Chem. Int. Ed., 45, pp. 8156-8160, 2006.
Tice, J.D. et al., "Effects of viscosity on droplet formation and mixing in microfluidic channels", Analytica Chimica Acta, 507, pp. 73-77, 2004.
Tan, Y-C. et al., "Monodispersed microfluidic droplet generation by shear focusing microfluidic device", Sensors & Actuators B, 114, pp. 350-356, 2006.
Sauter, C. et al., "From Macrofluidics to Microfluidics for the Crystallization of Biological Macromolecules", Crystal Growth & Design, vol. 7, No. 11, pp. 2247-2250, 2007.
Ng, J.D. et al., "In situ X-ray analysis of protein crystals in low-birefringent and X-ray transmissive plastic microchannels", Acta Cryst, D64, pp. 189-197, 2008.
Ostermeier et al., "Crystallization of membrane proteins," Current Opinion in Structural Biology, 7(5), pp. 697-701, 1997.
Talreja et al., "Screening and optimization of protein crystallization conditions through gradual evaporation using a novel crystallization platform," J. Appl. Cryst., 38, 988-995, 2005.
He et al., "Determination of Critical Supersaturation from Microdroplet Evaporation Experiments," Crystal Growth & Design, 6(5), 1175-1180, 2006.
He et al., "Direct Growth of γ-Glycine from Neutral Aqueous Solutions by Slow, Evaporation-Driven Crystallization," Crystal Growth & Design, 6(8), 1746-1749, 2006.
Murata et al., "Structural determinants of water permeation through aquaporin-1," Nature, vol. 407, 599-605, 2000.
Briggs et al., "The Temperature-Composition Phase Diagram and Mesophase Structure Characterization of Monopentadecenoin in Water," Biophysical Journal, vol. 67, pp. 1594-1602, 1994.
Kenis et al., "Mixing in the Formulation of Screens for Drug Leads or Crystallization Conditions in Microfluidic Systems," AIChE National Meeting, San Francisco, CA, (Abstract), 2006.

Kenis et al., "Microfluidic Platforms for Protein Crystallization Screening," AIChE National Meeting, San Francisco, CA, (Abstract), 2006.
Perry et al., "Microfluidic Platforms for Membrane Protein Crystallization," ACS Meeting, Chicago, IL, 2007.
Perry et al., "Microfluidic Generation of Lipidic Mesophases for Membrane Protein Crystallization & Supporting Information," Crystal Growth & Design, Article ASAP, 9 pages, 2009.

* cited by examiner

A

B

MICROFLUIDIC DEVICE FOR PREPARING MIXTURES

FEDERALLY SPONSORED RESEARCH OR DEVELOPMENT

This invention was made with government support under R21 GM075930-01 awarded by the National Institutes of Health. The government has certain rights in the invention.

BACKGROUND

Membrane proteins are critical components of many fundamental biological processes, enabling cell signaling and material and energy transduction across cellular boundaries.[1] As such, their malfunction has been linked to numerous diseases and they are common targets for pharmacological treatments.[2] However, rational drug design has been limited by difficulties in obtaining high resolution structural information on these proteins.

The key bottleneck in the determination of membrane protein structures is the identification of appropriate crystallization conditions. These proteins are typically available in quantities that are insufficient to screen a large number of conditions.[3] Additionally, they exhibit poor solubility due to their amphiphilic nature.[1,4] As a result, a tremendous disparity has developed between the number of known structures for membrane proteins (~368) as compared to soluble, globular proteins (>50,000).[5,6]

In recent years, microfluidic technology has been successfully utilized for high throughput screening of crystallization conditions at the nanoliter scale or smaller.[3,7] Thus far crystallization of membrane proteins in microfluidic systems has been limited to in-surfo methods where detergents are used to solubilize membrane proteins and crystallization is attempted as for soluble proteins.[3,8]

While traditional microfluidic devices have often experienced difficulties in dealing with highly viscous, complex, or congealing fluids, a method of two-phase flow has been able to handle this. In this method, droplets are isolated from the surrounding walls by means of a carrier fluid and are mixed internally by viscous forces. In this manner it is able to deal with viscous or congealing materials such as blood.[3,53] The droplet mixer, while able to deal with more viscous fluids, still requires the flow of all materials for the formation of droplets. It is also limited by fluid property requirements for the formation of these droplets. Furthermore, while droplets containing water and lipid can be formed, the shear forces present in droplet-based mixing are inadequate to drive mixing of these materials to form mesophases.

An alternative, in-meso crystallization method (also referred to as cubic lipidic phase cyrstallizatin or in-cubo crystallization) uses an artificial aqueous/lipid mesophase to maintain membrane proteins in a membrane-like environment.[1,4] This method exploits the complex phase behavior of aqueous/lipid systems (e.g. lamellar, bicontinuous cubic phases),[9,10] creating local variations in the curvature of the bilayers to drive crystal nucleation and growth.[1,4,10-13] Despite its benefits, implementation of the in-meso approach to crystallization on the microscale has been particularly difficult. To this point aqueous/lipid mesophases necessary for the in-meso approach have been prepared either by centrifugation,[12] or using coupled microsyringes; FIG. 1 illustrates coupled microsyringes having a volume of ≧20 μL.[14] Unfortunately both methods require quantities of purified membrane protein (10-500 μL) that are potentially inaccessible or undesirable.

Creation of the necessary lipidic mesophases at much smaller scales, for example using microfluidics, is particularly challenging due to the ~30-fold difference in the viscosities of the pure components: $2.45\times10^{-2}$ versus $7.98\times10^{-4}$ Pa-s for the monoolein lipid phase (1-monooleoyl-rac-glycerol) and the aqueous phase, respectively or the ~60,000-fold difference in the viscosity of the aqueous phase and the resulting mesophase (~48.3 Pa-s at a shear rate of 71.4 $s^{-1}$). Moreover, the resulting mixture exhibits highly non-Newtonian behavior.[15,16] The highly viscous and non-Newtonian nature of the fluids render previously reported mixing approaches ineffective.[17,18]

SUMMARY

In a first aspect, the present invention is a microfluidic device for preparing a mixture, comprising a mixer, the mixer comprising a plurality of chambers, each chamber having a volume of at most 1 microliter, a first plurality of channels, each channel fluidly connecting 2 chambers, a plurality of chamber valves, each chamber valve controlling fluid flow out of one of the plurality of chambers, and a first plurality of channel valves, each channel valve controlling fluid flow through one of the first plurality of channels.

In a second aspect, the present invention is a method of forming a mixture, comprising providing at most 1 microliter of a first fluid having a viscosity of at least 0.5 Pa-s; providing at most 1 microliter of a second fluid; and chaotically mixing the first and second fluids together, to form a mixture.

In a third aspect, the present invention is a method of forming a mixture, comprising providing at most 1 microliter of a first fluid having a first fluid viscosity; providing at most 1 microliter of a second fluid having a viscosity at least 10 times the first fluid viscosity; and chaotically mixing the first and second fluids together, to form a mixture.

In a fourth aspect, the present invention is a method of forming a mixture with a microfluidic device, comprising providing a microfluidic device, comprising a first chamber containing at most 1 microliter a first fluid, second and third chambers containing at most 1 microliter a second fluid, first and second channels, fluidly connecting the first and second chambers, third and fourth channels, fluidly connecting the first and third chambers, first, second and third chamber valves, each chamber valve controlling fluid flow out of the first, second or third chamber, respectively, and first, second, third and fourth channel valves, each channel valve controlling fluid flow through the first, second, third or fourth channel, respectively; and chaotically mixing the first and second fluids by transferring the fluids between the chambers a plurality of times, to form a mixture.

DEFINITIONS

A microfluidic device is a device for manipulating fluids having a volume of one milliliter of less, and where the smallest channel dimension is <1 mm. The total volume of fluids within the microfluidic device may be greater than one milliliter, as long as parts of the device can manipulate volumes of one milliliter or less.

A precipitant is a chemical which will cause the formation of a precipitate.

A cubic lipidic phase, also referred to as a bicontinuous lipid/water phase, is a homogeneous mixture of water and lipid as described in Landau, E. M.; Rosenbusch, J. P., *P Natl Acad Sci USA* 1996, 93, 14532-14535; and Caffrey, M., *Journal of Structural Biology* 2003, 142, 108-132.

Chaotically mixing or chaotic mixing is mixing in a manner similar to that of the baker's transformation (folding dough), where the thickness of striations of different materials are stretched and folded upon one another. Chaotic mixing can be carried out by using a sequence of flows involving reorientation of the material elements. Because these motions are sequenced over time they can be termed as time-periodic flows. An example of chaotic mixing is tendril-whorl flow—a repeating sequence of flows where the material is stretched and then experiences a twist. This type of mixing, and chaotic mixing in general, is further described in Ottino, J. M., *The kinematics of mixing: stretching, chaos, and transport*, Cambridge University Press, 1989. Examples of chaotic mixing are also provided below.

There are two ways in which the viscosity of liquids can be described. Traditionally, viscosity is reported at a zero shear rate. For most fluids this is a reasonable definition, and for common fluids, such as water, the viscosity does not vary with shear rate. These types of common fluids are termed "Newtonian fluids." "Non-Newtonian fluids" are those where the viscosity changes as a function of the applied shear rate. Corn starch in water is an example of a non-Newtonian fluid: it is very liquid under low stresses, but will resist deformation at higher stresses, such that people can run across a tank of the mixture as if it were a solid. However, for more complex fluids, particularly those with internal structure such as polymers or mesophases, the fluid behaves more as a plastic material: it remains unaffected by forces until a certain yield stress is reached, at which point it deforms. A zero shear rate viscosity of this complex fluid can be approximated from a model of the fluid behavior at higher shear rates, but it is not a directly measured quantity. Alternatively, viscosity can be determined for complex materials at a non-zero shear rate. Unless otherwise stated, the viscosity of Newtonian fluids is reported as the zero shear rate viscosity, and the viscosity of all other fluids is reported as the viscosity at a shear rate of 75 $s^{-1}$.

BRIEF DESCRIPTION OF THE DRAWINGS

FIG. 12(*d*) is an FTIR spectrum (black trace) of a protein crystal (inset position 1) with evident amide signals at 1540 $cm^{-1}$ and 1650 $cm^{-1}$ compared to the background signal (grey trace) from the array detector (e.g. position 2 in the inset).

DETAILED DESCRIPTION

In order to create chaotic mixing in a system where Re<1 the fluids must be stretched and folded upon themselves until the thickness of the lamellae is such that diffusion dominates. For mixing of aqueous mixtures in a batch system, a ring mixer has been reported previously that operates at high Péclet numbers such that a band of fluid is wrapped repeatedly around on itself.[19] Without invoking such symmetry arguments, another way to kinematically drive mixing is through the use of multiple mixing motions.[20] A simple back and forth motion, as in a syringe, is ineffective at small length scales because the fluid motion resulting from the first actuation will be identical to all subsequent repetitions. However, if the fluid is translated in one direction, and then a different motion, such as a rotation is included (for example, tendril-whorl flow), chaotic mixing is carried out. The addition of asymmetries to a system with respect to fluid flow can enhance the efficiency of the chaotic mixing.

The present invention is based on the discovery of an integrated microfluidic device capable of mixing lipids with aqueous solutions to enable sub-microliter screening for crystallization conditions in-meso. The device employs chaotic mixing via time-periodic flow to prepare homogeneous aqueous/lipid mesophases. Each batch consumes less than 1 microliter of each fluid, preferably less than 100 nanoliter of each fluid, typically 20 nanoliter or less of each fluid with the device illustrated in FIG. 2, and can be scaled down further to 0.1 nanoliter. Fluid flow in the bottom, fluid layer is controlled pneumatically through values in the upper control layer. Valves placed over fluid channels are used to block off flow, while valves placed over each fluid chamber enable ejection of fluid from that area of the device.

This microfluidic device for the on-chip formation of lipidic mesophases for in-meso crystallization has been demonstrated and validated using the membrane protein bacteriorhodopsin. The operational scale and amenability for high throughput processing of the microfluidic approach introduced here allows for a 1000-fold decrease in the total volume of mesophase that can be formulated and screened compared to the present in-meso crystallization screening approaches. Current methods, while able to dispense down to less than 1 nanoliter, formulate the mesophase in a syringe mixer that operates on the 10-100 microliter scale.[14,25] Moreover, the ability to set up a large number of trials allows for the detailed study of the interactions between artificial mesophases, membrane proteins, and precipitating agents.

Figure 2:
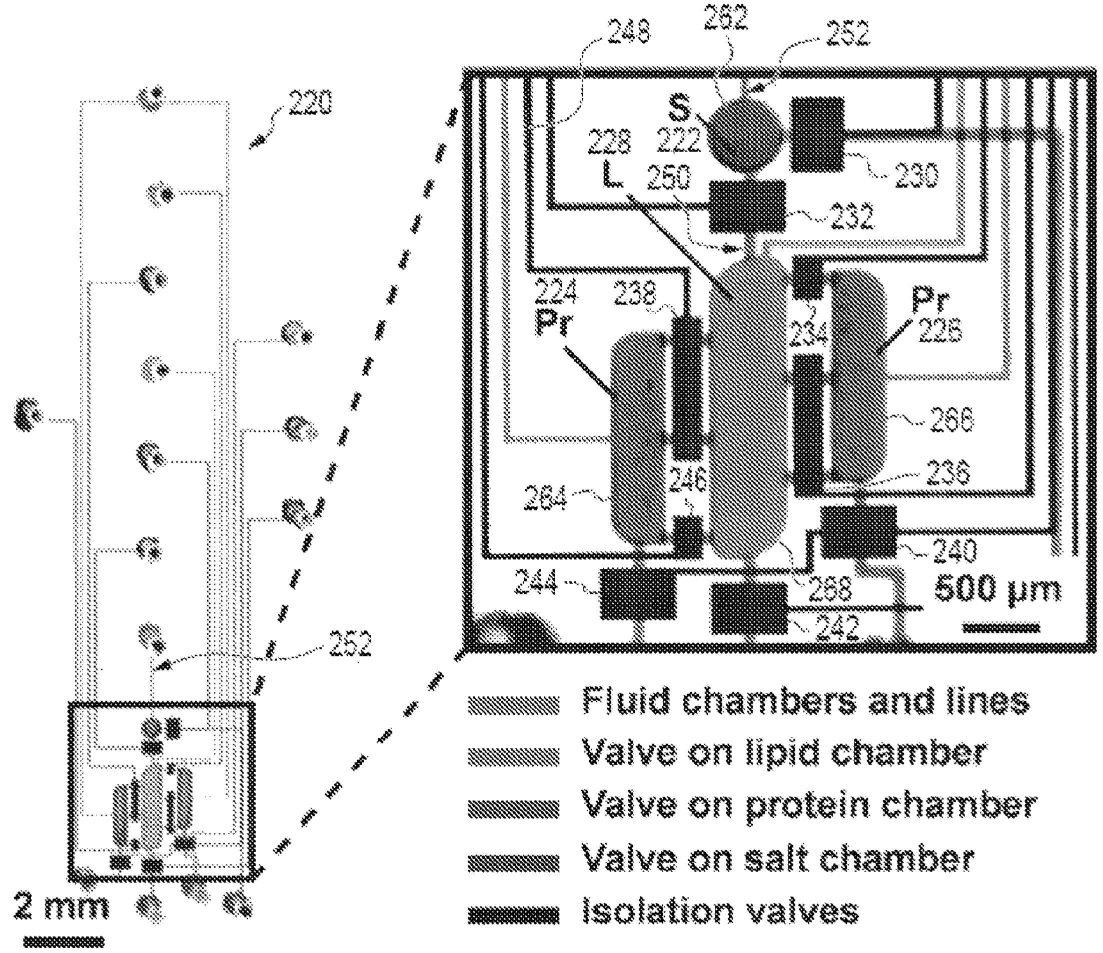
FIG. 2 is an optical micrograph of a microfluidic device. This microfluidic device is capable of mixing lipids (L) and aqueous protein (Pr) solutions by pneumatic actuation of the channel valves (black) and the chamber valves on top of the three large chambers (2-Pr, L). Metering of salt (S) solution (precipitant) is achieved through the circular chamber at the top.

FIG. 2 illustrates a microfluidic device 220 having a mixer. The device includes chambers 222, 224, 226 and 228. The chambers are fluidly connected by channels (gray lines); for example chamber 228 is connected to chamber 222 by channel 250. Other channels, such as channel 252, allow each chamber to be filled from a source internal or external to the microfluidic device. Collectively, these elements are part of the fluid layer of the microfluidic device.

The microfluidic device also includes channel valves 230, 232, 234, 236, 238, 240, 242, 244 and 246, located at some point over each channel, for controlling fluid flow through the channel over which it is located. The valves can close off the channel when fluid pressure, typically a fluid such as air or water, is applied to the valve. For example, double channel valves 238 (two valves controlling fluid flow through two of the channels connecting chamber 226 and chamber 222) may both be closed by applying air pressure to the valves through control channel 248. Furthermore, fluid flow out of each chamber may be controlled by chamber valves 262, 264, 266 and 268, located over each chamber respectively, when fluid pressure, typically a fluid such as air or water, is applied to the chamber valve. Collectively, these elements are part of the control layer of the microfluidic device. In FIG. 2, the microfluidic device is shown containing protein solutions Pr, lipid L and a precipitant (in this case, salt) S.

Figure 1:
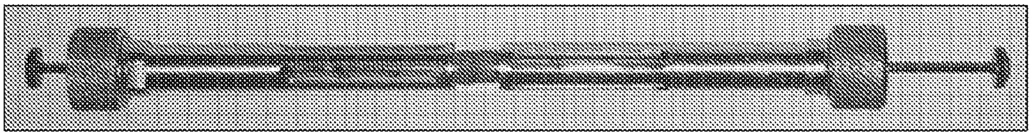
FIG. 1 illustrates coupled microsyringes, a conventional device for forming a cubic lipidic phase.[14] The protein solution and lipid are loaded into separate syringes and then mixed by a back and forth actuation of the plungers. Relatively high shear forces present through the microbore coupling help mixing.
Figure 3:
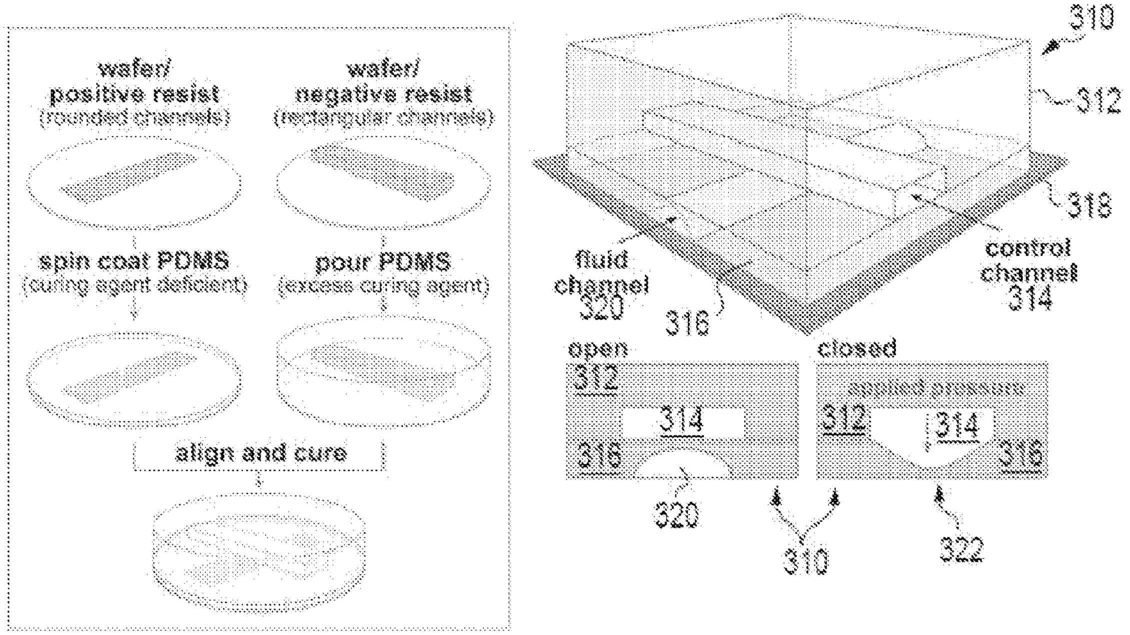
FIG. 3A is an illustration of how the valves are formed by forming a fluid channel and a control channel together.
FIG. 3B illustrates a schematic of a fluid channel and its associated control channel, and cross-sections of the open and closed pneumatic valves, used to open and close fluid lines (reagent channels) and move fluid in and out of chambers in a microfluidic device. Positive pressure is applied to the control channel that then pushes down on the elastic membrane, causing the channel to collapse and producing a valving effect. Preferably, this fluid channel has a rounded shape so that it can seal off completely without fluid leakage through corners.

FIG. 3A is an illustration of how the valves are formed by forming a fluid channel and a control channel together. The fluid channel, which is preferably rounded, is formed preferably using a positive resist on a wafer or substrate, which is then coated with an elastic material, such as polydimethylsiloxane (PDMS). The control channel, which is preferably rectangular, is formed preferably using a negative resist on a wafer or substrate, which is then coated in an elastic material, such as PDMS. A deficiency of curing agent is used during forming the fluid channel, and an excess of curing agent is used during formation of the control channel. The two structures are then aligned and cured, to form the valve.

FIG. 3B illustrates a fluid channel and its associated control channel, and a cross-section of an open and closed valve, respectively. Valve 310 is formed by a top layer 312 (which may be formed from polymers and/or plastics, such PDMS or polyimides such as Kapton®, for example) and control channel 314 in combination with elastic membrane 316; the elastic membrane (formed from polymers and/or plastics, such PDMS or polyimides such as Kapton®, for example) separates the control layer and the fluid layer. The fluid channel 320 is defined by the elastic membrane and the bottom layer 318 (which may also be formed from polymers and/or plastics, such PDMS or polyimides such as Kapton®, for example, or glass or silicon, for example). When fluid pressure is applied to the valve through the control channel, the elastic membrane will deform 322, which will close off a channel or empty a chamber located in the fluid layer. The elastic membrane may be formed form any elastic material, such as polymers or plastics, that is compatible with the solvents and compounds which will be used in the microfluidic device. Other parts and layers of the microfluidic device may be made from polymer, plastic, ceramics, glass, metals, alloys, and combinations thereof. Preferably, the device contains polymers, such as siloxanes and/or epoxides.

Each mixer contains at least 2 chambers, and at least 2 of these chambers are connected to at least 2 channels. Each chamber is controlled by a chamber valve, and each channel is open or closed by a channel valve. Multiple channel valves or chamber valves may be controlled together (such as double channel valve 238 in FIG. 2), but these are consider to be two different valves. Each mixer preferably contains 3-100 chambers, more preferably 4-20 chambers, including 5, 6, 7, 8, 9 and 10 chambers. Each mixer preferably contains 3-100 channels, more preferably 4-50 channels, including 5, 6, 7, 8, 9 and 10 channels. Preferably, each chamber has a volume of at most 1 microliter, more preferably at most 100 nanoliters (for example, 0.1 to 100 nanoliters), including at most 20 nanoliters and at most 10 nanoliters (for example, 0.1 to 10 nanoliters).

Figure 14:
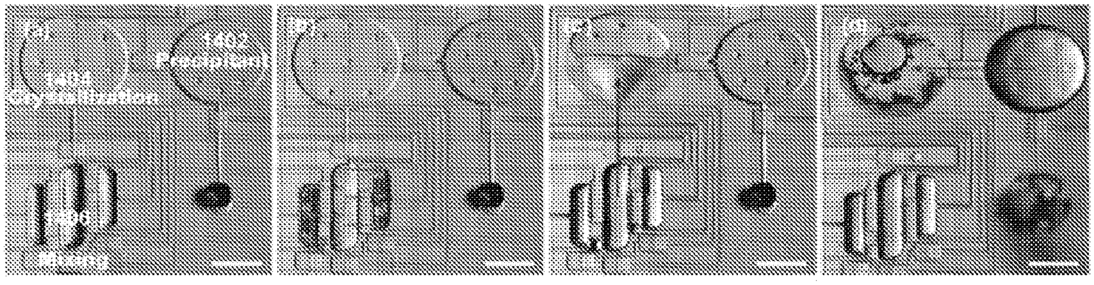
FIGS. 14(*a*)-(*d*) are optical micrographs of an alternative embodiments of a microfluidic device showing sequences for growing crystals.

In an alternative aspect, the microfluidic device may include a larger separate chamber where crystallization may take place, and a larger chamber for the precipitant, to improve control of addition of the precipitant. As depicted in FIG. 14(*a*) one chamber (crystallization reservoir 1402) enables precise metering of the salt solution (or other precipitant) to be added to the mesophase, whereas the second chamber (1404) is the site for crystallization where the mesophase and salt solution are brought together. FIGS. 14(*a*)-(*d*) depict crystallization: first the three chambers of the mixer 1406 in the bottom left corner are filled with lipid and protein (FIG. 14(*a*)) and then mixed with each other (FIG. 14(*b*)). After mixing, the content of the mixing chambers is injected into the crystallization reservoir (FIG. 14(*c*)) and then salt solution is added (FIG. 14(*d*)). The bubbles that appear upon injecting the salt/precipitant solution merge and disappear over time.

Figure 10:
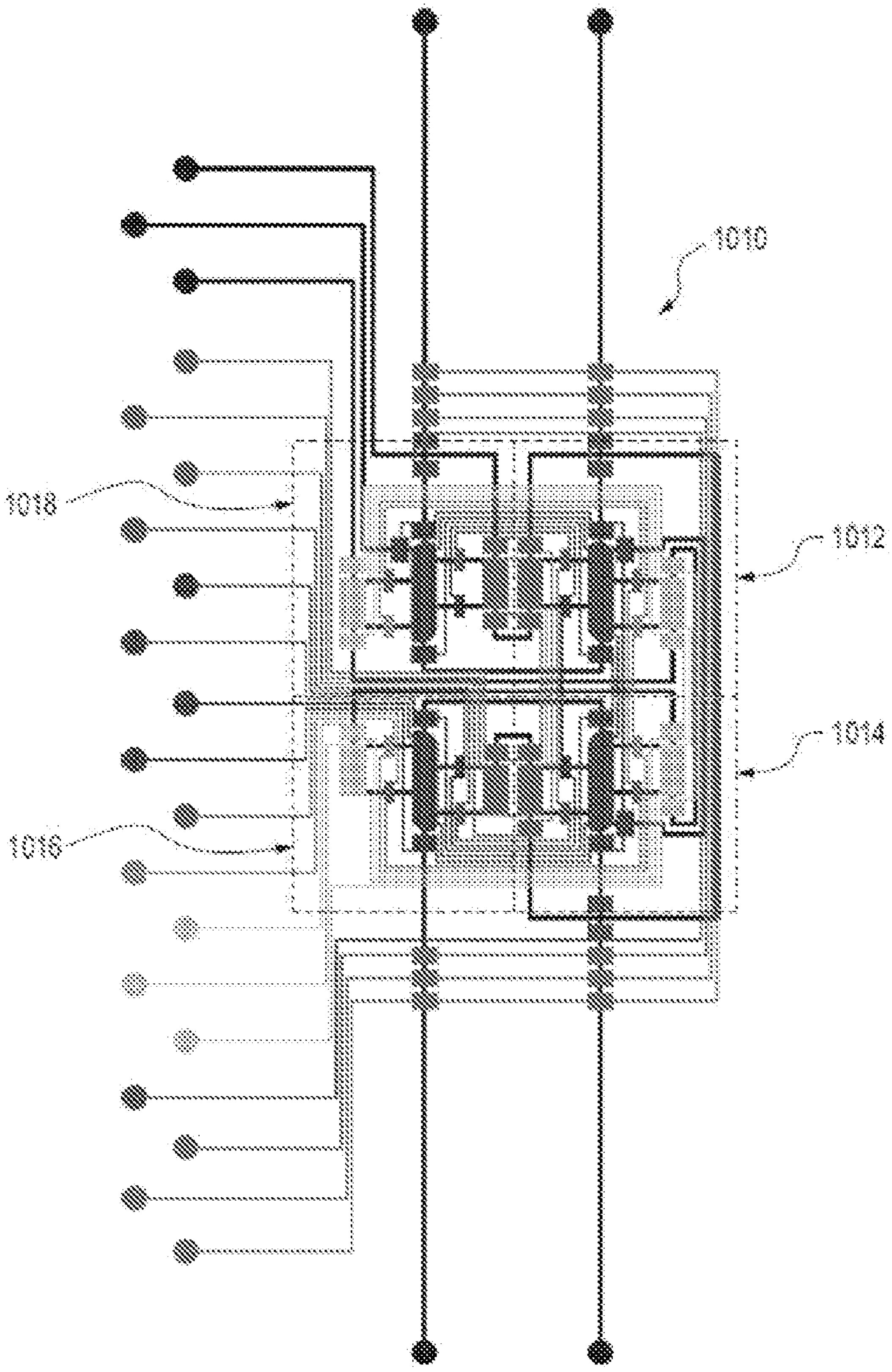
FIG. 10 shows a schematic of a microfluidic device for preparing 4 different trials in parallel. Loading of protein and lipid solutions is done for all 4 trials by a single set of lines with metering of volumes achieved by the size of the various chambers. Mixing is also performed in parallel by a single set of valves that operate all 4 trials. Separate lines for precipitant addition are used.
Figure 11:
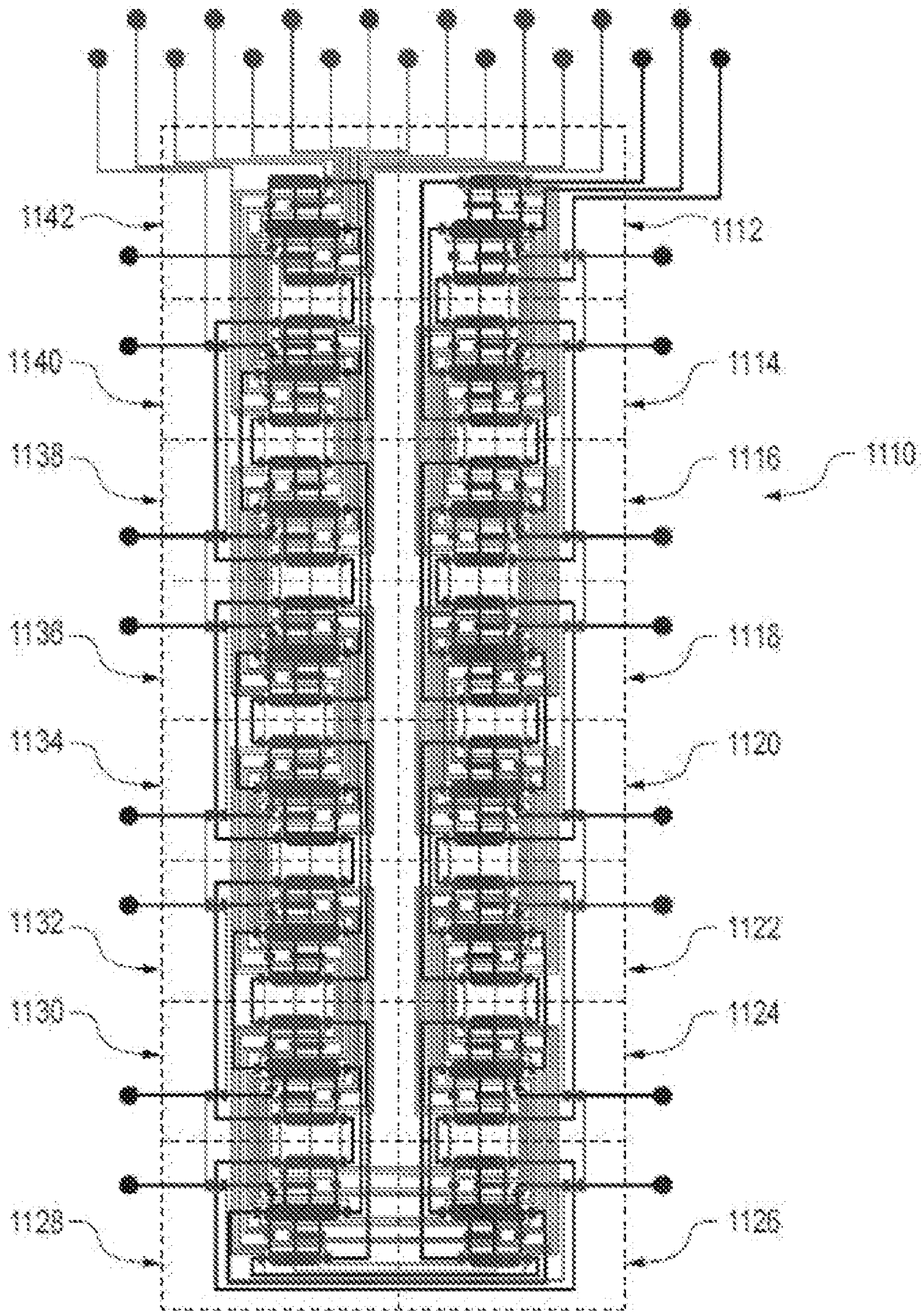
FIG. 11 shows a schematic of a microfluidic device for preparing 16 different trials in parallel. Loading of protein and lipid solutions is done for all 16 trials by a single set of lines with metering of volumes achieved by the size of the various chambers. Mixing is also performed in parallel by a single set of valves that operate all 16 trials. Separate lines for precipitant addition are used.

Multiple mixers may be integrated into a single microfluidic device. For example, FIG. 10 illustrates a microfluidic device 1010 including 4 mixers 1012, 1014, 1016 and 1018. Another example is illustrated in FIG. 11, where microfluidic device 1110 includes 16 mixers 1112, 1114, 1116, 1118, 1120, 1122, 1124, 1126, 1128, 1130, 1132, 1134, 1136, 1138, 1140 and 1142.

FIGS. 4-9 provide examples of chaotically mixing liquids using a microfluidic device. Each sequence represents a cycle of mixing and describes the device-scale motion of fluid. Chaotic mixing occurs at the fluid-scale in a tendril-whorl fashion as fluid is moved through the narrow injection channels and into a larger fluid chamber where swirling occurs. The cycles may be repeated until mixing is complete. The examples use mixers have 2 or 3 channels connecting each chamber; however, the same sequences can be used to chaotically mix liquids with 2, 3, 4 or more channels connecting the chambers. The presence of more channels connecting the chambers increases the number of whorls of recirculation that occur once the fluid enters a chamber. Similar to kneading bread, where the dough is folded onto itself, the whorls increases the number of folds per cycle.

Figure 4:
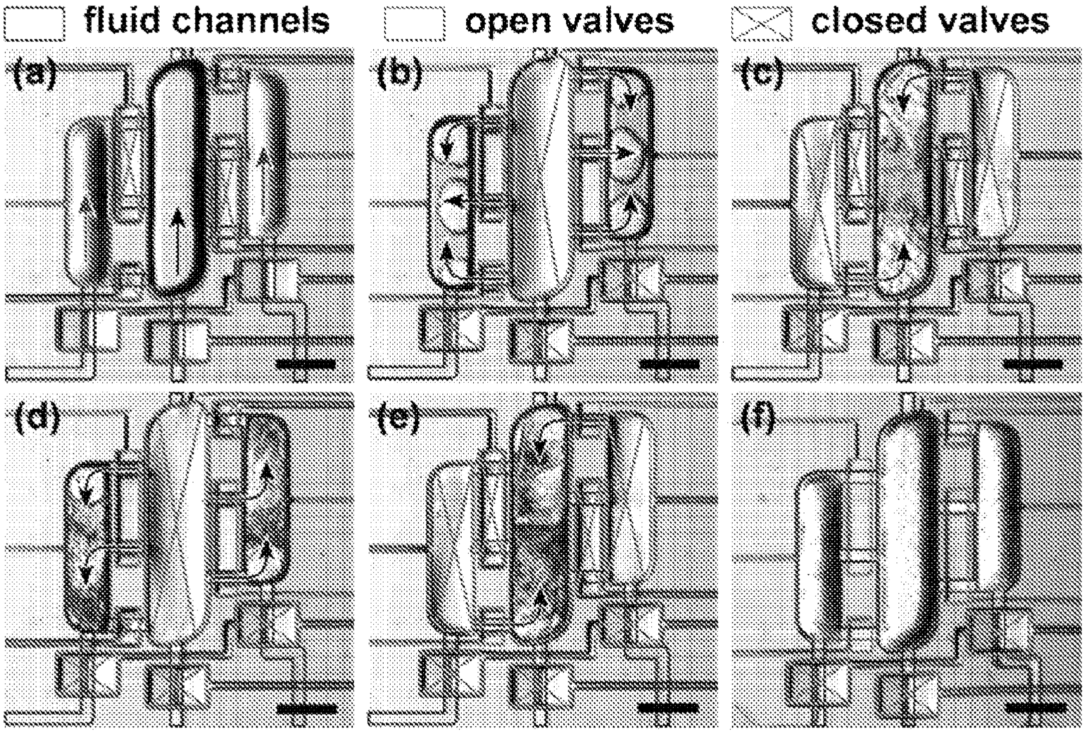
FIGS. 4(*a*)-(*f*) are optical micrographs of an aqueous solution of 9.95 mg/mL bacteriorhodopsin solution being mixed with the lipid monoolein in a microfluidic chip where the mixing chambers are connected by three channels each. Lines delineate the edges of the fluidic channels. (*a*) Filling of chambers with protein solution and lipid through inlet channels (arrows); (*b*) Straight-line injection of lipid into the protein-containing side chambers; (*c-e*) Consecutive, chamber-to-chamber injection of the fluid mixture through different sets of inlets to create a net circulatory motion. The mixing cycle then repeats starting at (*b*). (*f*) The slightly birefringent mixture (observed through partially crossed polarizers) after 30 minutes of mixing. Scale bar: 500 micrometers.

FIGS. 4(*a*)-(*f*) are optical micrographs of an aqueous solution of 9.95 mg/mL bacteriorhodopsin solution being chaotically mixed with the lipid monoolein in a microfluidic device. This sequence of images summarizes the major fluid motions present in the mixing scheme for an optimal design where the mixer includes 3 channels connecting the chambers. FIG. 4(*a*) shows filling of chambers with protein solution and lipid through inlet channels (arrows). FIG. 4(*b*) shows straight-line injection of lipid into the protein-containing side chambers. FIGS. 4(*c*)-(*e*) show consecutive, chamber-to-chamber injection of the fluid mixture through different sets of inlets to create a net circulatory motion, then the mixing cycle repeats starting at (*b*). FIG. 4(*f*) shows the slight birefringence of the mixture (observed through partially crossed polarizers) after 30 minutes of mixing (scale bar: 500 micrometers).

Figure 5:
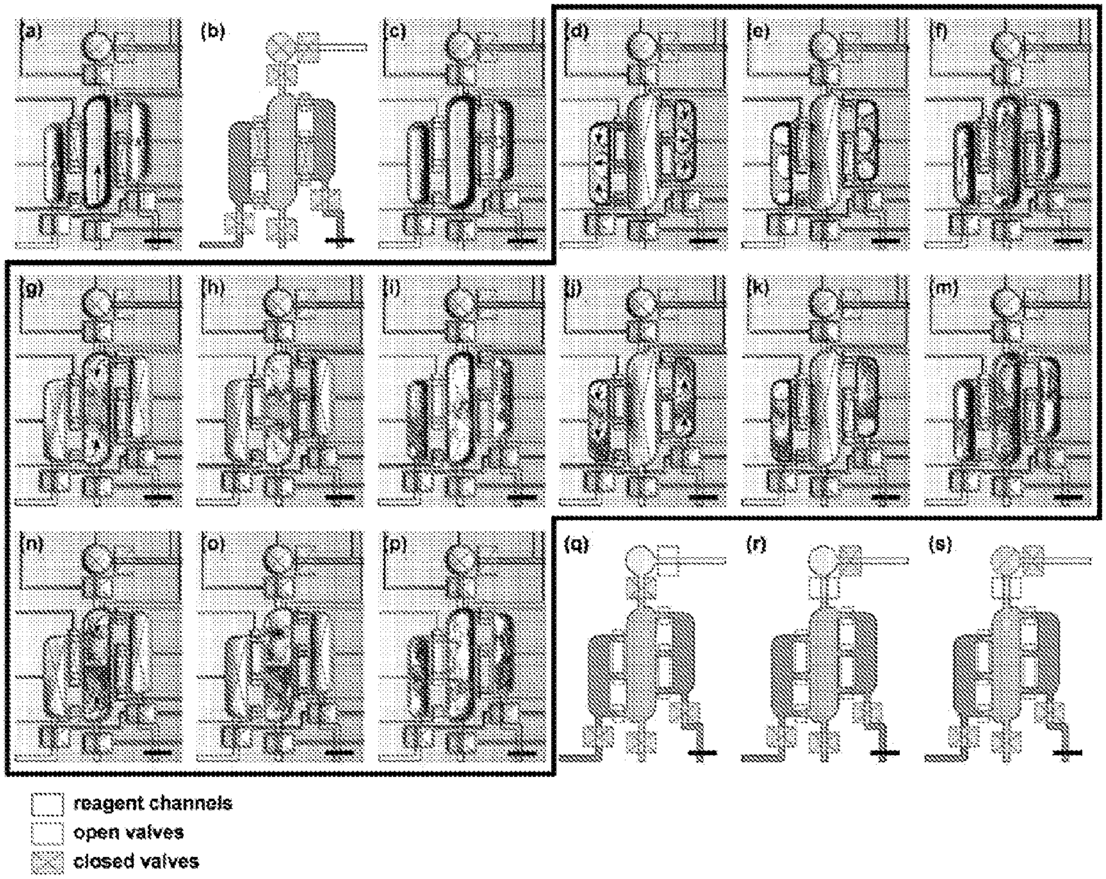
FIGS. 5(*a*)-(*s*) are schematic depictions of mixing device operation where the mixing chambers are connected by three channels each. Optical micrographs are of an aqueous solution of 9.95 mg/mL bacteriorhodopsin solution being mixed with monoolein on a microfluidic device acquired through a cross-polarizer. Lines delineate the edges of the fluidic channels. (*a-c*) Protein solution and lipid loading sequence. (*d-o*) The step-by step mixing sequence. (*p-r*) Injection of precipitant solution. Scale bar: 500 micrometers.

FIGS. 5(*a*)-(*s*) provide a detailed schematic depiction of each individual valve actuation used during the optimal method for mixing device operation for the optimal design where the mixer includes 3 channels connecting the chambers. The optical micrographs are of an aqueous solution of 9.95 mg/mL bacteriorhodopsin solution being chaotically mixed with monoolein on a microfluidic device acquired through a cross-polarizer. FIGS. 5(*a*)-(*c*) show the protein solution and lipid loading sequence. FIGS. 5(*d*)-(*o*) show the step-by-step mixing sequence. FIGS. 5(*p*)-(*r*) show injection of the precipitant solution (scale bar: 500 micrometers).

Figure 6:
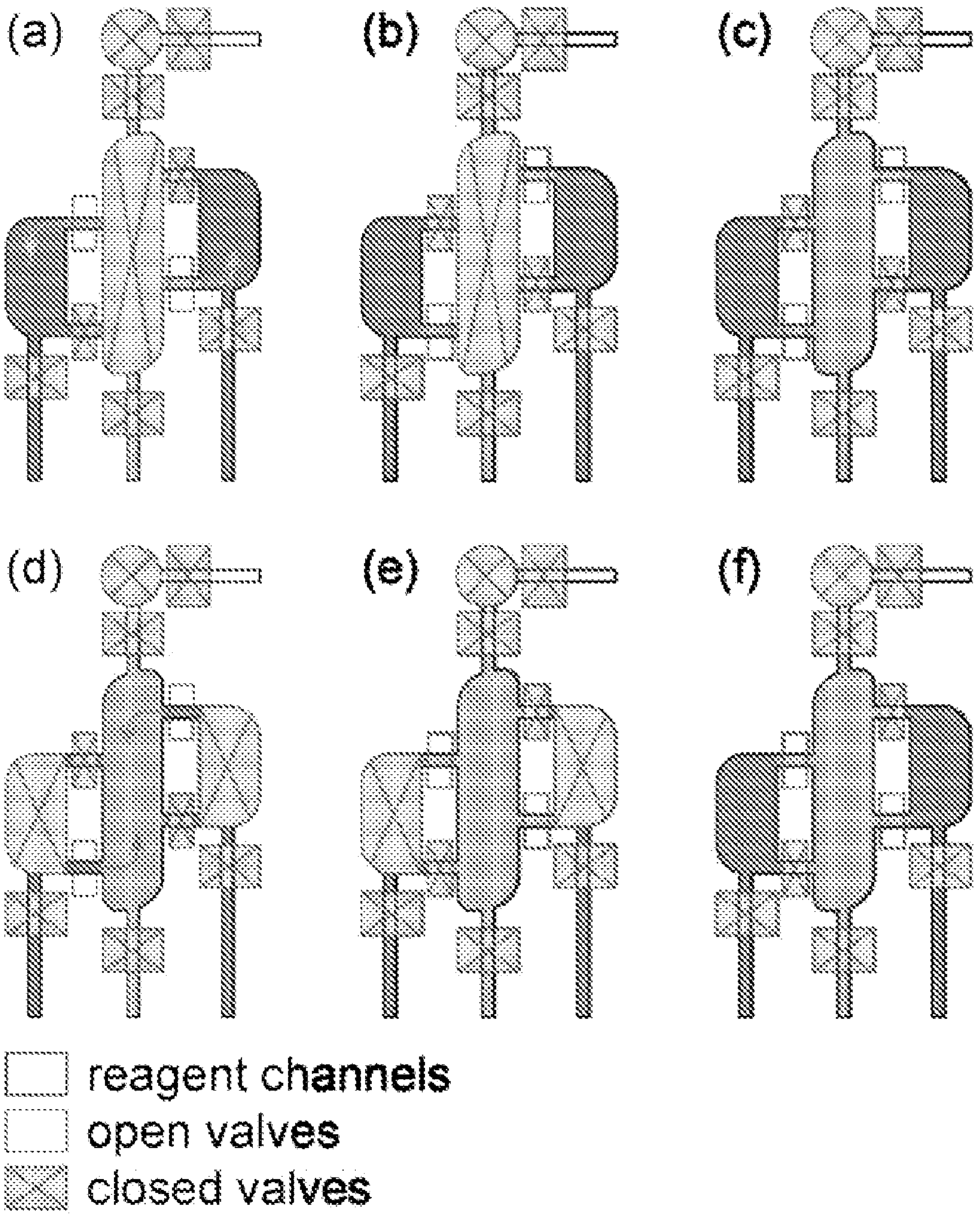
FIGS. 6(*a*)-(*f*) illustrate a schematic depiction of another mixing device operational sequence where the mixing chambers are connected by only two channels each. Lines delineate the edges of the fluidic channels. Gray lines indicate valves. Solid areas with crossed lines indicate closed valves. Consecutive, chamber-to-chamber injection of the fluid mixture through different sets of inlets creates a net circulatory motion.

FIGS. 6(*a*)-(*f*) illustrate a detailed schematic depiction of a mixing device operation where the mixer includes 2 channels connecting the chambers. This sequence of motions results in recirculation of the fluid from the center chamber through one injection line to the side chamber and out the other. Whorl flow is indicated by the curved arrows depicting how fluid would swirl in the various chambers after injection. The increased mixing of this type of tendril-whorl flow promotes efficient chaotic mixing. The chaotic mixing may also be carried out using the same sequence, but starting halfway through the cycle.

Figure 7:
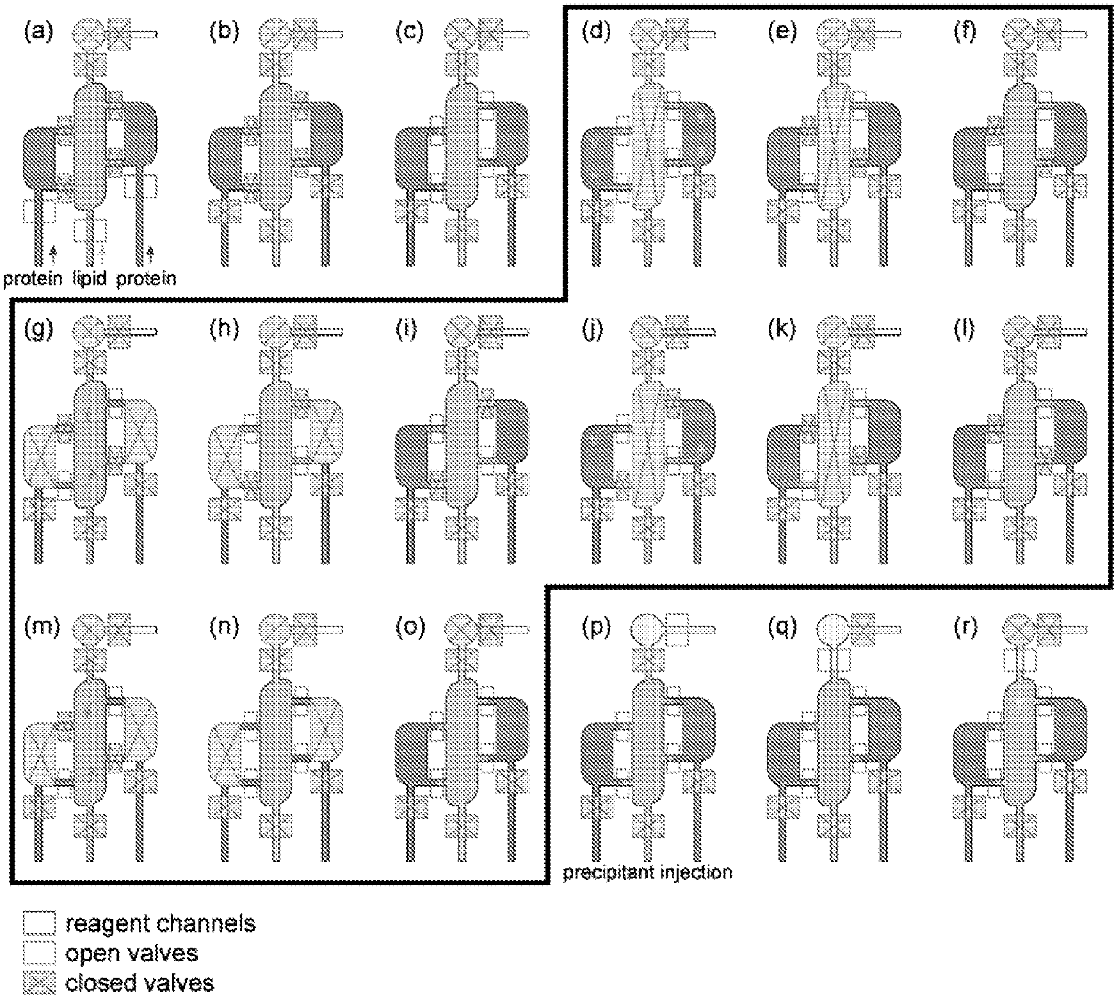
FIGS. 7(*a*)-(*r*) illustrate a schematic depiction of still another mixing device operational sequence where the mixing chambers are connected by only two channels each. The mixing sequence is an optimized mixing sequence for the two channel design. Lines delineate the edges of the fluidic channels. Gray lines indicate valves. Solid areas with crossed lines indicate closed valves. (*a-c*) Protein solution and lipid loading sequence. (*d-o*) The step-by step mixing sequence. (*p-r*) Injection of precipitant solution.

FIGS. 7(*a*)-(*r*) illustrate a detailed schematic depiction of a mixing device operation. The sequence for chaotically mixing the liquids is an optimized mixing sequence for 2 channels connecting the chambers. The sequence of figures depicts the initial stages of filling the device, the chaotic mixing of the liquids (FIGS. 7(*d*)-(*o*)), and the addition of a precipitant. The mixing depicted combines both recirculation and back-and-forth flows, which together enhance mixing efficiency.

Figure 8:
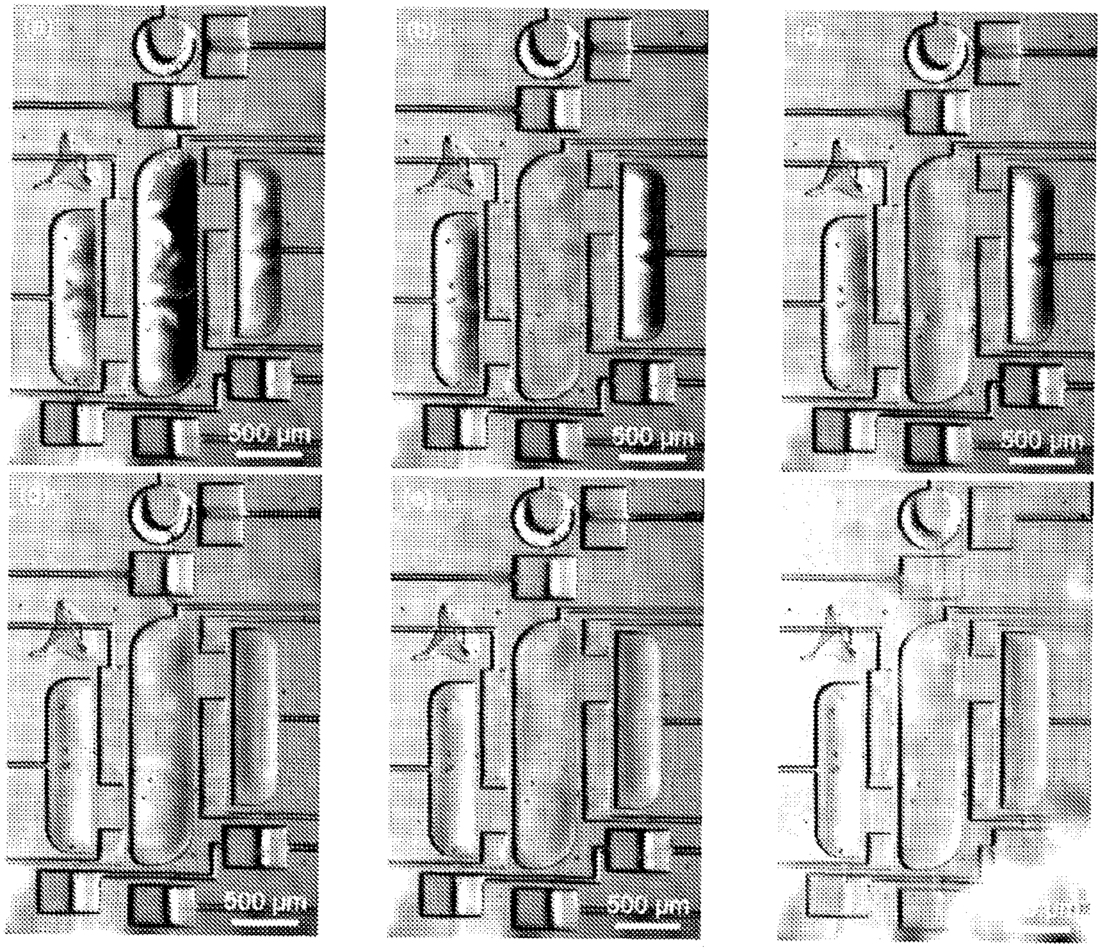
FIGS. 8(*a*)-(*f*) are optical micrographs illustrating the use of birefringence as an indicator of the degree of mixing. Images were taken at 2 minute intervals from the start of mixing.

FIGS. 8(*a*)-(*f*) are optical micrographs illustrating the use of birefringence as an indicator of mixing. The sequence of images taken during mixing shows the decrease in birefringence and increase in sample uniformity as mixing of the aqueous solution and lipid progresses, to form a cubic lipidic phase. Birefringence may not completely disappear, or may not disappear until sufficient time has passed for diffusion to complete formation of the cubic lipidic phase. Since the cubic lipidic phase is symmetrical in all directions, no birefringence is observed. FIG. 8(*a*) shows 2 minutes of mixing. FIGS. 8(*b*)-(*f*) show an additional 2 minutes of mixing after the preceding image.

Figure 9:
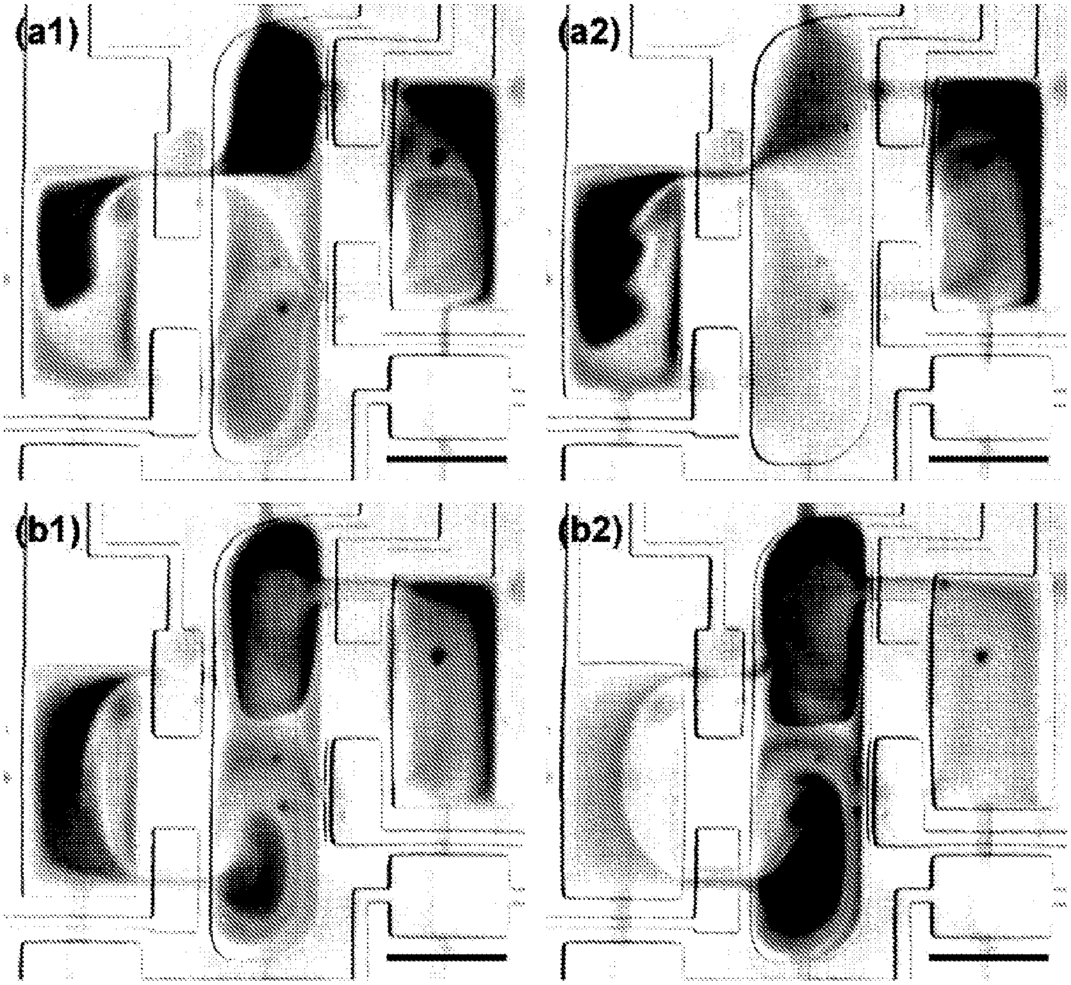
FIGS. 9(*a*1)-(*b*2) are optical micrographs illustrating the internal "whorling" that occurs as fluid travels through the injection channel and enters the larger fluid chamber. This flow is visualized using glycerin and glycerin mixed with food dye. (*a*1)-(*a*2) and (*b*1)-(*b*2) are two sets of sequential images of fluid being moved and the resulting whorls of flow that can be seen clearly as streaks of color. The scalebar is 500 micrometers.

FIGS. 9(*a*1)-(*b*2) are optical micrographs illustrating the internal tendril-whorl flow that occurs as fluid travels through the injection channel and enters the larger fluid chamber. This flow is visualized using glycerin and glycerin mixed with food dye. FIGS. 9(*a*1) and (*a*2) show sequential images of fluid being moved from the center chamber through the upper left and lower right injection lines into the side chambers. FIGS. 9(*b*1) and (*b*2) Sequential images of fluid being moved from the side chamber through the lower left and upper right injection lines into the center. The whorls of flow can be seen clearly as streaks of color.

The microfluidic device is particularly useful for mixing liquids which differ significantly in viscosity, or where at least one of the liquids has a high viscosity. The microfluidic device may be used to mix 2, 3, 4, 5 or more liquids. For Newtonian fluids having a zero shear rate viscosity which can be measured, it is preferable that two of the fluids have a ratio of viscosities of at least 10:1, at least 20:1, at least 30:1, at least 50:1, at least 100:1, at least 500:1, at least 1000:1, at least $10^4$:1, at least $10^5$:1, at least $10^6$:1, at least $10^7$:1, at least $10^8$:1, or even at least $10^9$:1. The ratio of viscosities may be 1:1 to $10^9$:1, 10:1 to $10^8$:1, or 100:1 to $10^7$:1. Preferably at least one or at least two or more, of the fluids have a viscosity of at least 0.5 Pa-s, at least 1 Pa-s, at least 2 Pa-s, at least 5 Pa-s, at least 10 Pa-s, at least 100 Pa-s, at least 1000 Pa-s, at least $10^4$ Pa-s, at least $10^5$ Pa-s, at least $10^6$ Pa-s, at least $10^7$ Pa-s, or even at least $10^8$ Pa-s. At least one, two or more of the liquids preferably have a viscosity of 0.5 to $10^8$ Pa-s, 1 to $10^7$ Pa-s, 2 to $10^6$ Pa-s, or even 5 to $10^5$ Pa-s.

For non-Newtonian fluids or other fluids for which a zero shear rate viscosity either cannot be measured or is not applicable, the viscosity is measured at a shear rate of 75 $s^{-1}$; it is preferable that two of the fluids have a ratio of viscosities of at least 10:1, at least 20:1, at least 30:1, at least 50:1, at least 100:1, at least 500:1, at least 1000:1, at least $10^4$:1, or even at least 60,000:1. The ratio of viscosities may be 1:1 to 60,000:1, 10:1 to 6000:1, or 100:1 to 600:1. Preferably at least one or at least two, or more, of the fluids have a viscosity of at least 0.5 Pa-s, at least 1 Pa-s, at least 2 Pa-s, at least 5 Pa-s, at least 10 Pa-s, at least 100 Pa-s, at least 1000 Pa-s, at least $10^4$ Pa-s, or even at least 60,000 Pa-s. At least one, two or more of the liquids preferably have a viscosity of 0.5 to 60,000 Pa-s, 1 to $10^4$ Pa-s, 2 to 1000 Pa-s, or even 5 to 100 Pa-s.

The following are examples of fluids which may be mixed together or with other fluids or solutions: water ($10^{-3}$ Pa-s), glycerin (1.4 Pa-s), partially mixed water-monoolein mesophases ($10^6$ Pa-s zero shear rate viscosity or 48.3 Pa-s at the shear rates present in the device), monoolein ($2\times10^{-2}$ Pa-s). Other aqueous and non-aqueous solutions, liquids and mixtures may also be used. Particularly preferred are water; aqueous solutions of proteins, peptides, biological molecules, polymers, organic molecules and pharmaceuticals; lipids, hydrocarbons, surfactants; and solutions or mixtures thereof. The microfluidic device is particularly useful for preparing mesophases containing one or more proteins, such as membrane proteins. Adding a precipitant (such as salts, buffers, and solvents) to the mesophase may be used to form crystals of the protein or complexes containing the protein(s), allowing for in-meso crystallization. Once the crystals have formed, they may be removed from the microfluidic device for further analysis, or may be analyzed without being removed from the microfluidic device (in situ analysis), using techniques such as X-ray crystallography for determining the structure of the compound(s) and/or protein(s) present in the crystal(s), spectroscopic analysis, and other analytic techniques.

Figure 15:
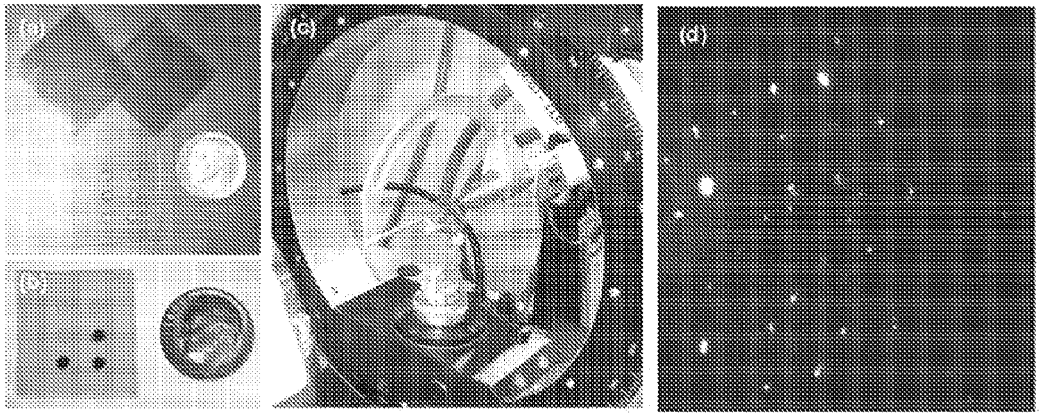
FIGS. 15(*a*)-(*d*) are photographs of a Kapton®/PDMS/Kapton® hybrid microfluidic device: (*a*) the pieces; (*b*) the microfluidic device assembled with three wells filled with food coloring; and (*c*) the microfluidic device mounted on the goniometer of our X-ray set-up. (*d*) high quality X-ray diffraction data of a model sucrose single crystal placed in this Kapton®/PDMS/Kapton® hybrid microfluidic device.
Figure 16:
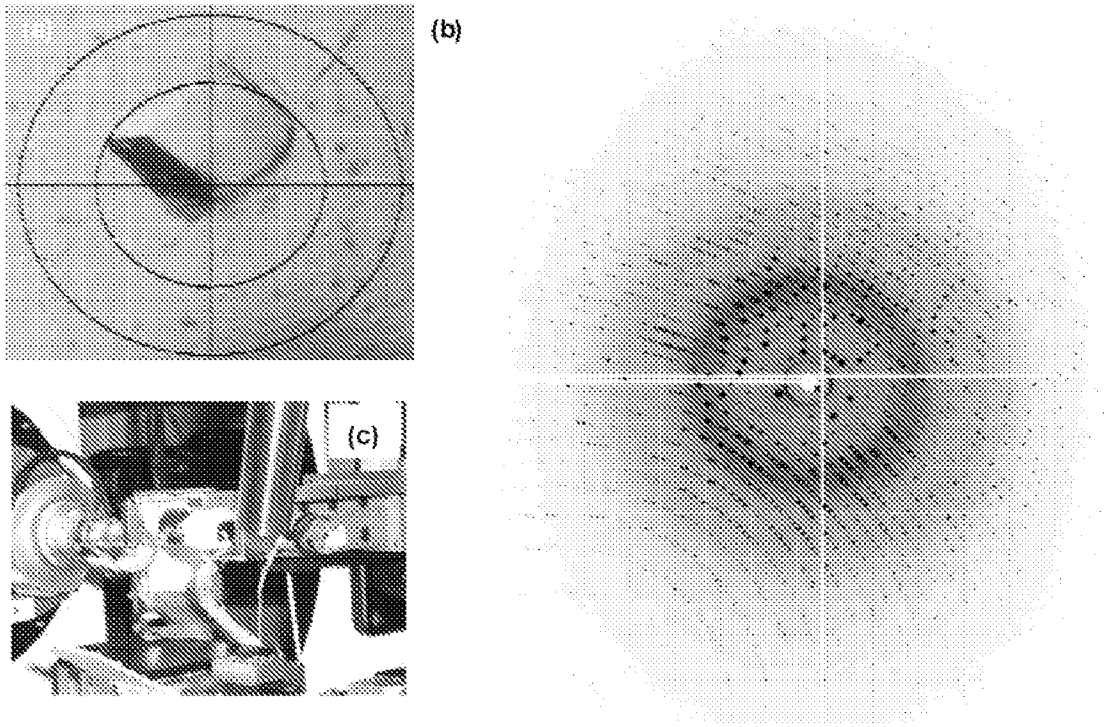
FIGS. 16(*a*)-(*c*) are photograph of a lysozyme crystal mounted under cryogenic conditions in a Kapton®/PDMS/Kapton® hybrid microfluidic device; (*b*) an X-ray diffraction image taken as part of a complete dataset. Complete data was obtained to a resolution of 1.1 Å, with higher resolution data extending beyond the range of the detector. (*c*) Photograph of the device mounted in the goniometer.

To minimize X-ray scattering and attenuation by the microfluidic device, a hybrid devices including of Kapton® (polyimide) sheets that sandwich a thin functional PDMS layer may be used, as illustrated in FIGS. 15(*a*) and (*b*). Preferably, the PDMS layer has a thickness of 100 micrometers or less, more preferably 10-20 micrometers. High quality X-ray data was obtained from a sucrose crystal placed in the model device illustrated in FIGS. 15(*a*) and (*b*), using a bench top X-ray source (shown in FIG. 15(*c*)). Atomic resolution data (1.1 Å) was obtained from a crystal of the soluble protein lysozyme and high resolution data (2.5 Å) was obtained for the membrane protein aquaporin-z at cryogenic conditions using a similar device configuration at the X6A beamline at the National Synchrotron Light Source at Brookhaven National Laboratories (FIGS. 16(*a*)-(*c*)).

In another aspect, a microfluidic device may be used for high throughput determination (via X-ray diffraction) of the phase diagram of lipids intended for in-meso crystallization. Two possible ways of doing so include varying the composition and varying the temperature. Varying Composition: though in-meso crystallization experiments operate within a relatively narrow range of lipid/water compositions, phase diagram determinations require examination of the entire range. Mesophases may be prepared within the range of 0% to 100% (such as 0%, 5%, 10%, 15%, 20%, 25%, 30%, 35%, 40%, 45%, 50%, 55%, 60%, 65%, 70%, 75%, 80%, 85%, 90%, 95% and 100%), preferably 25% to 75%, lipid in the microfluidic device. Varying Temperature: phase behavior may be examined using temperature control within the device, while they are mounted in an X-ray beam. Appropriate off-the-shelf temperature control elements are available that can be integrated with the microfluidic devices. Resistive heaters embedded in Kapton® films are also available. Temperature sensors may be integrated in the microfluidic device.

Protein solutions preferably contain 1 to 200 mg/mL of protein, more preferably 10-25 mg/mL of protein, and typically the protein solutions have a concentration of the protein which is less than the solubility limit of the protein under the solution conditions present (i.e., the protein solution is not supersaturated). The amount of protein solution in the microfluidic device may be less than 1 microliter, less than 0.1 microliter, less than 100 nanoliters, less than 10 nanoliters, and even less than 1 nanoliters, such as 1-100 nanoliters. The proteins may have molecular weights of, for example, 1000 to 100,000 g/mol. The amount of protein solution need to form crystals may be as little as 10 to 100 picoliters.

The following table lists the zero shear rate viscosity of different C18 cubic mesophases (mixture of C18 lipids, including monoolein) which may be mixed in the microfluidic device. Mixtures may have any percentage of water, such as 50%, and may be mixed in the microfluidic device.

| Water (wt %) | Zero-Stress Viscosity (Pa-s) |
|---|---|
| 14 | 1.51E+07 |
| 16 | 1.13E+07 |
| 17 | 7.97E+06 |
| 18 | 6.72E+06 |
| 19 | 6.32E+06 |
| 20 | 5.76E+06 |
| 21 | 4.82E+06 |
| 22 | 4.53E+06 |
| 24 | 4.13E+06 |
| 26 | 4.64E+06 |

EXAMPLES

Metering of reagents, mixing, and incubation was performed in an integrated, 2-layer microfluidic device (FIG. 2), molded from polydimethylsiloxane (PDMS).[7] Fluid flow in the bottom, fluid layer is controlled pneumatically. Valves placed over fluid channels are used to block off flow, while valves placed over each fluid chamber enable ejection of fluid from that area of the device. Protein solution and lipid are introduced into the side (4.9 nanoliters each) and center chambers (9.6 nanoliters), respectively (FIG. 4*a*), displacing air, which escapes by permeation through the PDMS. A precipitant solution (for example, salt) is introduced from the top circular chamber.

As a proof-of-concept, in-meso crystallization of the membrane protein bacteriorhodopsin was performed using this device. A mixture of monoolein and a solution of bacteriorhodopsin (9.95 mg/mL solubilized in 25 mM $NaH_2PO_4$ with 1.2% w/v octyl β-D-glucopyranoside, pH 5.5) were combined in an approximately 1:1 volume ratio and mixed into a homogeneous mesophase (FIG. 4(*f*)).

For the lipid mixer presented here the asymmetric arrangement of the side chambers (FIG. 4) enables offset fluid injection into the center chamber. The rounded chambers also reduce the amount of fluid not involved in the mixing process (dead volume). Two levels of fluid motion should be considered; device-scale fluid motion, and mixing-scale fluid motion. Combined, these motions are used to induce folding of the two fluid components such that the length-scale of the individual lamellae is on the order of the diffusion length. On the device-scale, three separate motions are used to direct fluid within the device. Two fluid motions (FIGS. 4(*c*) and (*d*) and FIGS. 5(*g-j*)) using chamber valves and opposite sets of diagonal injection lines (channels) generates two cells of recirculating flow between the center chamber and the two side chambers of the device. A third, straight-line motion breaks up the periodicity of this recirculating flow at the beginning of each cycle by actuation of the chamber valve above the central compartment with all six injection lines open (FIG. 4(*b*) and FIG. 5(*d*)). A complete mixing cycle is composed of a sequence of 12 different valve actuations and involves a single straight-line injection followed by 1.5 cycles of recirculating flow (FIG. 5(*d-p*)). Actuation of valves was achieved using pneumatic actuation. These steps are actuated with equal spacing at a total cycle speed of 25 to 5 seconds per cycle, for less than 5 minutes total.

The sequence of valve actuation for filling the microfluidic device is shown in FIGS. 5(*a*)-(*c*):

FIG. 5(*a*)—Protein solution and lipid are filled through inlet channels into their respective chambers. The channels connecting chambers are shut with microfluidic valves to prevent different liquids from coming into contact during the filling process.

FIG. 5(*b*)—The inlet channels are shut, isolating the reagents within the microfluidic chambers.

FIG. 5(*c*)—Isolation valves over the injection lines are opened upon start of the computer-driven mixing program.

The step-by-step actuation of valves for the mixing program is shown in FIGS. 5(*d*)-(*o*). Cycles of this sequence are run with equal time spacing per step at speeds varying from 25 to 5 seconds per cycle.

FIG. 5(*d*)—Injection from the center chamber into the side chambers through injection lines using the pneumatic valve over the center chamber. In this image the initial injection of lipid into the protein solution is depicted.

FIG. 5(*e*)—Diagonal isolation valves covering two injection lines are closed.

FIG. 5(*f*)—The valve over the center chamber is opened.

FIG. 5(*g*)—The mixture is directed back into the center chamber through two of the six fluid channels by utilizing valves over the outer chambers and a set of diagonal injection lines.

FIG. 5(*h*)—The diagonal isolation valves covering two injection channels each are opened and the opposite set of isolation valves, covering only a single injection line each, are closed.

FIG. 5(*i*)—The valves over the outer chambers are opened.

FIG. 5(*j*)—The mixture is pushed into the outer chambers through two injection lines on a side.

FIG. 5(*k*)—The isolation valves over the single injection channels are opened and those over the double injection channels are closed.

FIG. 5(*l*)—The valve over the center chamber is opened.

FIG. 5(*m*)—The mixture is injected into the center chamber.

FIG. 5(*n*)—The isolation valves over all of the injection lines are opened.

FIG. 5(*o*)—The valves over the outer chambers are opened. This image shows the state of the mixture after a single mixing cycle.

At the mixing-scale employed, tendril-whorl type flow was used for chaotic mixing. Tendril-type flow occurs as the fluid is moved from one fluid chamber to another through a narrow injection channel. Whorl-type flow occurs as fluid leaves the injection channel and enters a fluid chamber where it then whorls about in an eddy-like fashion (FIG. 9). This whorl motion is particularly noticeable when fluid enters a chamber from multiple injection lines (FIGS. 9(*b*1)-(*b*2)). Birefringence from lamellar regions was used to visualize the extent of mixing in the device. After being thoroughly mixed, the aqueous/lipid mixture was observed to be homogeneous and transitioned from a metastable birefringent phase into a non-birefringent cubic phase within a few hours. It is important to note that the loss of birefringence, while evidence of complete mixing, is not the sole indicator, and that metastability of the mesophases leads to variations in time for this change to occur. The use of device asymmetries, multiple mixing motions both on the device-scale and the fluid mixing scale provided better mixing efficacy when used in tandem than did the individual effects.

After mixing is complete, a separate line can be used to meter and inject specific amounts of a precipitant solution, such as salt, by sequential actuation of the isolation valves and the valve located over the circular precipitant chamber (FIGS. 5(*p*)-(*r*)). The valves over the inlet to the precipitant chamber and the chamber itself are opened to allow filling (FIG. 5(*p*)). The inlet valve to the precipitant chamber is closed and the outlet valve connecting the chamber to the mixing chambers is opened (FIG. 5(*q*)). Actuation of the valve over the precipitant chamber is used to drive in the precipitant solution (FIG. 5(*r*)). This process can be repeated to meter in additional quantities of precipitant solution, as defined by the geometry of the chamber.

Figure 12:
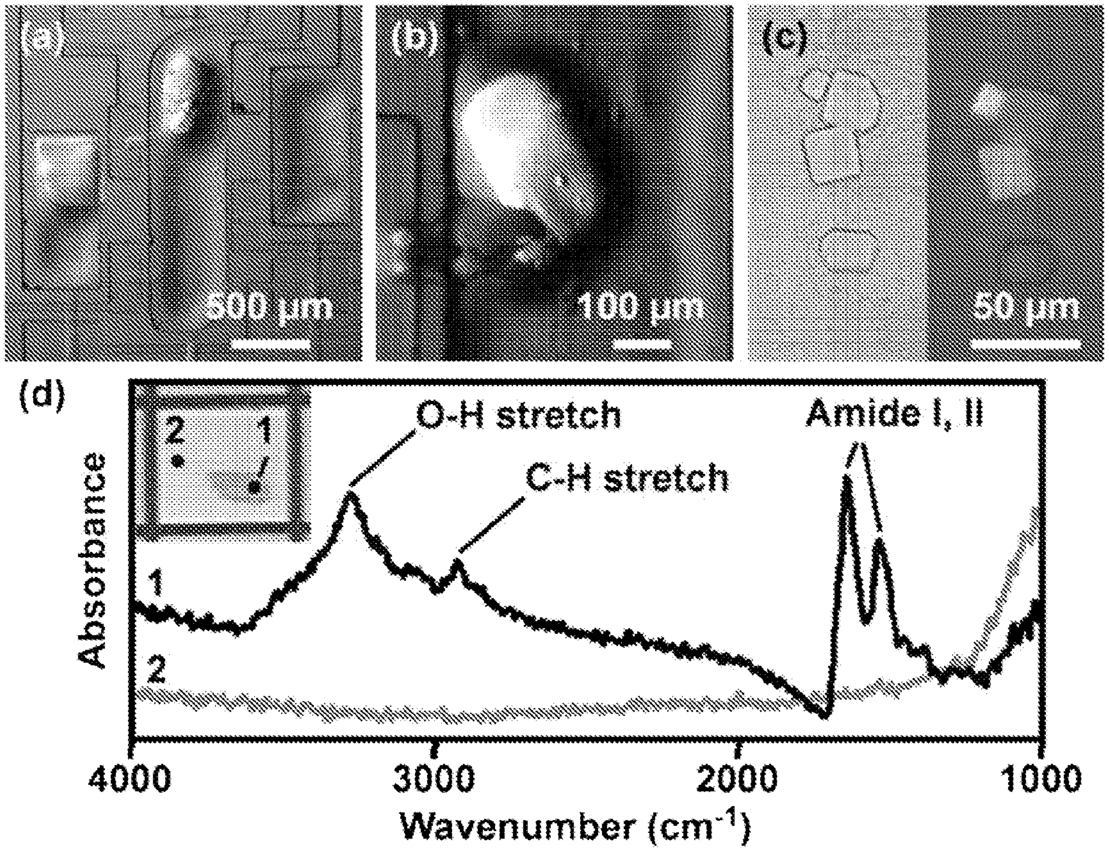
FIGS. 12(*a*)-(*c*) are optical micrographs of bacteriorhodopsin crystals grown within the microfluidic device via the in-meso method.
Figure 13:
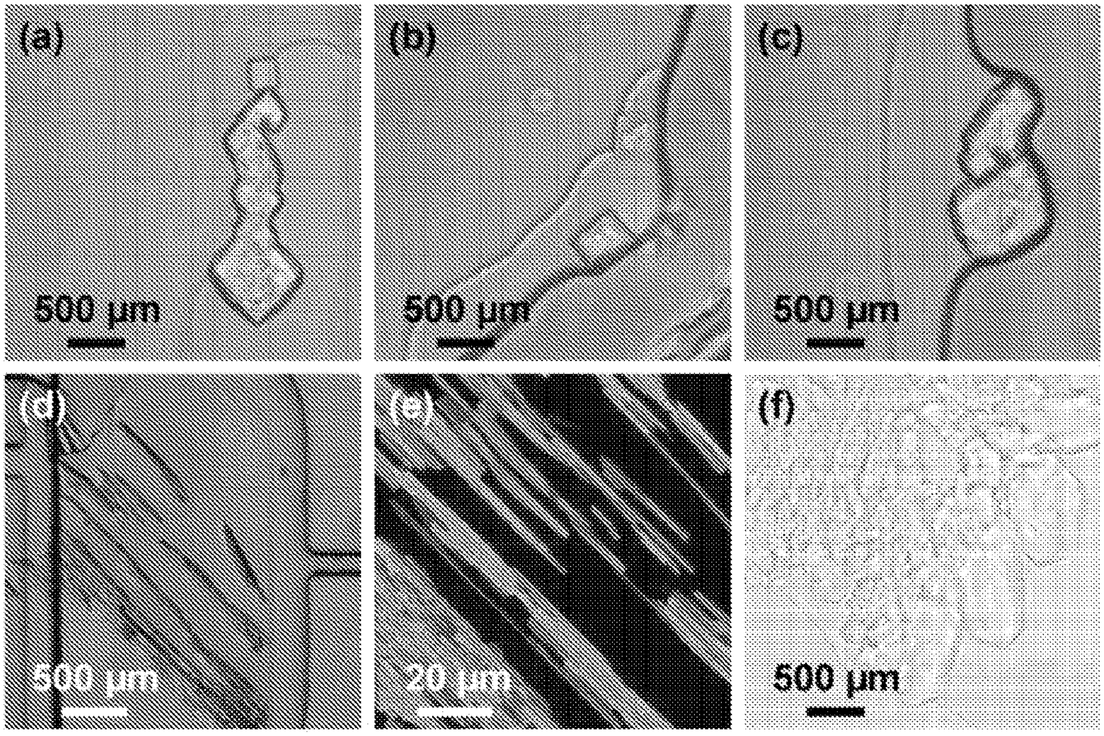
FIGS. 13(*a*)-(*f*) are optical micrographs of crystals resulting from (*a*)-(*c*) 25 mM $NaH_2PO_4$ and with 1.2% w/v octyl β-D-glucopyranoside, (*d*) and (*e*) 2.5M Sørenson phosphate buffer solution, (f) a mixture of 25 mM $NaH_2PO_4$ and with 1.2% w/v octyl β-D-glucopyranoside with monoolein and 2.5M Sørenson phosphate buffer as a precipitant.

For the proof-of-concept experiment involving the in-meso crystallization of the membrane protein bacteriorhodopsin, a precipitant solution of 2.5M Sørenson phosphate buffer at pH 5.6 was then introduced from the top chamber and the sample was stored in the dark at room temperature. The addition of this precipitant solution is thought to induce local changes in the mesophase that are hypothesized to drive crystal nucleation and growth.[1,4,10-13] Crystals typically appeared within a few days (FIGS. 12(*a-c*)) and grew to similar or larger dimensions than what was previously reported in the literature over a couple of weeks.[1,4] Crystals ranging in shape from cubic, to needle-like, to octagonal were observed. Control experiments were performed in order to better identify the various crystal forms observed, and FTIR experiments were used to positively identify that, indeed, the crystals were made of the protein.

Initial control experiments involved crystallization of the various components separately. Next, crystallization experiments with a combination of the components in an in-meso crystallization experiment, except for the protein, were performed. All control crystallization experiments were performed in the microfluidic device described here, though mixing was only used when necessary. For single component trials, crystallization was driven by evaporative drying in the device. A solution of 25 mM $NaH_2PO_4$ and with 1.2% w/v octyl β-D-glucopyranoside, pH 5.5 was prepared in order to determine what crystals resulted in the absence of protein. Crystallization of the salt and detergent solution resulted in cubic crystals (FIGS. 12(*a*)-(*c*)). Colorless needle-like crystals resulted from the crystallization of the 2.5M Sørenson phosphate buffer used as a precipitant (FIGS. 12(*d*) and (*e*)).

The in-meso crystallization trial resulted in branched dendrites and colorless crystals that appeared to be hexagonal.

In order to confirm the identity of the crystals observed in the trials, an FTIR microscope with an array detector was used (FTS 7000 spectrometer with Varian FTIR microscope (UMA 600) and Focal Plane Array detector 32×32). The protein crystal was extracted from the device and placed on a calcium fluoride window (FIG. 12(*d*) inset). An optical microscope then was used to locate and align the crystal for analysis. Lipid and detergent are expected to show strong O—H and C—H stretching absorbance, with a strong C═O signal also present for the lipid. Amide signals, however, are unique to the protein and can be used for identification. In the sample tested, very clear amide I and II signals were observed near 1540 $cm^{-1}$ and 1650 $cm^{-1}$ (FIG. 12(*d*)).

REFERENCES (1) Landau, E. M.; Rosenbusch, J. P., *P Natl Acad Sci USA* 1996, 93, 14532-14535.
(2) Quick, M.; Javitch, J. A., *P Natl Acad Sci USA* 2007, 104, 3603-3608.
(3) Li, L.; Mustafi, D.; Fu, Q.; Tereshko, V.; Chen, D. L. L.; Tice, J. D.; Ismagilov, R. F., *P Natl Acad Sci USA* 2006, 103, 19243-19248.
(4) Rummel, G.; Hardmeyer, A.; Widmer, C.; Chiu, M. L.; Nollert, P.; Locher, K. P.; Pedruzzi, I.; Landau, E. M.; Rosenbusch, J. P., *Journal of Structural Biology* 1998, 121, 82-91.
(5) RCSB Protein Data Bank. http://www.rcsb.org/ (accessed Nov. 9, 2007).
(6) Membrane Proteins of Known 3D Structure. http://blanco.biomol.uci.edu/Membrane_Proteins_xtal.html (accessed Nov. 9, 2007).
(7) Hansen, C. L.; Skordalakes, E.; Berger, J. M.; Quake, S. R., *P Natl Acad Sci USA* 2002, 99, 16531-16536.
(8) Sommer, M. O. A.; Larsen, S., *J Synchrotron Radiat* 2005, 12, 779-785.
(9) Briggs, J.; Chung, H.; Caffrey, M., *J Phys Ii* 1996, 6, 723-751.
(10) Cherezov, V.; Fersi, H.; Caffrey, M., *Biophys J* 2001, 81, 225-242.
(11) Grabe, M.; Neu, J.; Oster, G.; Nollert, P., *Biophys J* 2003, 84, 854-868.
(12) Nollert, P., *Methods* 2004, 34, 348-353.
(13) Caffrey, M., *Journal of Structural Biology* 2003, 142, 108-132.
(14) Cheng, A. H.; Hummel, B.; Qiu, H.; Caffrey, M., *Chem Phys Lipids* 1998, 95, 11-21.
(15) Bonacucina, G.; Palmieri, G. F.; Craig, D. Q. M., *J Pharm Sci-Us* 2005, 94, 2452-2462.
(16) Mezzenga, R.; Meyer, C.; Servais, C.; Romoscanu, A. I.; Sagalowicz, L.; Hayward, R. C., *Langmuir* 2005, 21, 3322-3333.
(17) Hansen, C. L.; Sommer, M. O. A.; Quake, S. R., *P Nat Acad Sci USA* 2004, 101, 14431-14436.
(18) Stroock, A. D.; Dertinger, S. K. W.; Ajdari, A.; Mezic, I.; Stone, H. A.; Whitesides, G. M., *Science* 2002, 295, 647-651.
(19) Squires, T. M.; Quake, S. R., *Rev Mod Phys* 2005, 77, 977-1026.
(20) Ottino, J. M., *The kinematics of mixing: stretching, chaos, and transport*, Cambridge University Press, 1989.
(21) Chou, H. P.; Unger, M. A.; Quake, S. R., *Biomedical Microdevices* 2001, 3, 323-330.
(22) Shim, J.-u.; Cristobal, G.; Link, D. R.; Thorsen, T.; Jia, Y.; Piattelli, K.; Fraden, S., *J Am Chem Soc* 2007, 129, 8825-8835.
(23) Cherezov, V.; Caffrey, M., *J Appl Crystallogr* 2005, 38, 398-400.
(24) Cherezov, V.; Caffrey, M., *J Appl Crystallogr* 2003, 36, 1372-1377.
(25) Cherezov, V.; Caffrey, M., *J Appl Crystallogr* 2006, 39, 604-606.
(26) Ismagilov, R. F.; Kenis, P. J. A.; Whitesides, G. H.; Rosmarin, D. Fluidic Switches and Methods for Controlling Flow in Fluidic Systems. U.S. Pat. No. 6,843,262 (Jan. 18, 2005).
(27) Unger, M. A.; Chou, H. P.; Thorsen, T.; Scherer, A.; Quake, S. R., *Science* 2000, 288, 113-116.
(28) Unger, M. A.; Chou, H.-P.; Thorsen, T. A.; Scherer, A.; Quake, S. R.; Liu, J.; Adams, M. L.; Hansen, C. L. Microfabricated Elastomeric Valve and Pump Systems. U.S. Pat. No. 6,929,030 (Aug. 16, 2005).
(29) Unger, M. A.; Chou, H. P.; Thorsen, T.; Scherer, A.; Quake, S. Microfabricated Elastomeric Valve and Pump Systems. U.S. Pat. No. 6,408,878 (Jun. 25, 2002).
(30) Unger, M. A.; Chou, H. P.; Thorsen, T. A.; Scherer, A.; Quake, S. R. Method of Making a Microfabricated Elastomeric Valve. U.S. Pat. No. 6,793,753 (Sep. 21, 2004).
(31) Unger, M. A.; Chou, H. P.; Thorsen, T. A.; Scherer, A.; Quake, S. R. Microfabricated Elastomeric Valve and Pump Systems. U.S. Pat. No. 7,144,616 (Dec. 5, 2006).
(32) Unger, M. A.; Chou, H. P.; Thorsen, T. A.; Scherer, A.; Quake, S. R. Microfabricated Elastomeric Valve and Pump Systems. U.S. Pat. No. 7,169,314 (Jan. 30, 2007).
(33) Unger, M. A.; Chou, H. P.; Thorsen, T.; Scherer, A.; Quake, S.; Enzelberger, M.; Adams, M.; Hansen, C. Microfabricated Elastomeric Valve and Pump Systems. U.S. Pat. No. 7,216,671 (May 15, 2007).
(34) Unger, M. A.; Chou, H. P.; Manger, I. D.; Fernandes, D.; Yi, Y. Microfluidic Devices for Introducing and Dispensing Fluids from Microfluidic Systems. U.S. Pat. No. 6,951,632 (Oct. 4, 2005).
(35) Hansen, C. L.; Quake, S. R.; Berger, J. M. High Throughput Screening of Crystallization of Materials. U.S. Pat. No. 7,195,670 (Mar. 27, 2007).
(36) Quake, S. R.; Hansen, C. L. High Throughput Screening of Crystallization of Materials. U.S. Pat. No. 7,052,545 (May 30, 2006).
(37) Zhou, X.; Lau, L.; Lam, W. W. L.; Au, S. W. N.; Zheng, B., *Anal Chem* 2007, 79 (13), 4924-4930.
(38) Hansen, C. L.; Quake, S. R.; Berger, J. M. Microfluidic Protein Crystallography Techniques. U.S. Pat. No. 7,217,321 (May 15, 2007).
(39) Hansen, C. L.; Classen, S.; Berger, J. M.; Quake, S. R., *J Am Chem Soc* 2006, 128, 3142-3143.
(40) Garcia-Ruiz, J. M.; Otalora, F.; Novella, M. L.; Gavira, J. A.; Sauter, C.; Vidal, O., *J Cryst Growth* 2001, 232, 149-155.
(41) Garcia-Ruiz, J. M.; Gonzalez-Ramirez, L. A.; Gavira, J. A.; Otalora, F., *Acta Crystallogr D* 2002, 58, 1638-1642.
(42) Gavira, J. A.; Toh, D.; Lopez-Jaramillo, J.; Garcia-Ruiz, J. M.; Ng, J. D., *Acta Crystallogr D* 2002, 58, 1147-1154.
(43) Ng, J. D.; Garcia-Ruiz, J. M.; Gavira-Gallardo, J. A.; Wells, M.; Jenkins, G. Crystallization Cassette for The Growth and Analysis of Macromolecular Crystals and an Associated Method. U.S. Pat. No. 7,118,626 (Oct. 10, 2006).
(44) Ng, J. D.; Gavira, J. A.; Garcia-Ruiz, J. M., *Journal of Structural Biology* 2003, 142, 218-231.

(45) Lopez-Jaramillo, F. J.; Garcia-Ruiz, J. M.; Gavira, J. A.; Otalora, F., *J Appl Crystallogr* 2001, 34, 365-370.
(46) Chen, D. L.; Gerdts, C. J.; Ismagilov, R. F., *J Am Chem Soc* 2005, 127, 9672-9673.
(47) Zheng, B.; Gerdts, C. J.; Ismagilov, R. F., *Current Opinion in Structural Biology* 2005, 15, 548-555.
(48) Zheng, B.; Ismagilov, R. F., *Angew Chem Int Edit* 2005, 44, 2520-2523.
(49) Zheng, B.; Roach, L. S.; Ismagilov, R. F., *J Am Chem Soc* 2003, 125, 11170-11171.
(50) Zheng, B.; Tice, J. D.; Roach, L. S.; Ismagilov, R. F., *Angew Chem Int Edit* 2004, 43, 2508-2511.
(51) Yadav, M. K.; Gerdts, C. J.; Sanishvili, R.; Smith, W. W.; Roach, L. S.; Ismagilov, R. F.; Kuhn, P.; Stevens, R. C., *J Appl Crystallogr* 2005, 38, 900-905.
(52) Gerdts, C. J.; Tereshko, V.; Yadav, M. K.; Dementieva, I.; Collart, F.; Joachimiak, A.; Stevens, R. C.; Kuhn, P.; Kossiakoff, A.; Ismagilov, R. F., *Angew Chem Int Edit* 2006, 45, 8156-8160.
(53) Tice et al., Anal Chim Acta, 2004, 507(1), 73-77.
(54) Tan et al., Sensors & Actuators B, 2006, 114(1), 350-356.
(55) Garstecki et al., U.S. Patent Publication, Publication No. US 2006/0280029 (Dec. 14, 2006).
(56) Pugia et al., U.S. Patent Publication, Publication No. US 2005/0041525 (Feb. 24, 2005).
(57) Sauter et al., Cryst Growth Design, 2007, 7(11), 2247-2250.
(58) Ng et al., Acta Cryst D, 2008, 64(2), 189-197.

What is claimed is:

1. A microfluidic device for preparing a mixture, comprising a mixer, the mixer comprising:

a plurality of chambers, each chamber having a volume of at most 1 microliter, a first plurality of channels, each channel fluidly connecting 2 chambers, a plurality of chamber valves, each chamber valve controlling fluid flow out of one of the plurality of chambers, and a first plurality of channel valves, each channel valve controlling fluid flow through one of the first plurality of channels, wherein the plurality of chambers includes a first chamber, a second chamber and a third chamber, the plurality of channels includes a first channel, a second channel, a third channel, and a fourth channel, the first channel and the second channel form a parallel fluid connection between the first chamber and the second chamber, and the third channel and the fourth channel form a parallel fluid connection between the third chamber and the second chamber.

2. The microfluidic device of claim 1, wherein the plurality of chambers is 3-100 chambers.

3. The microfluidic device of claim 1, wherein the first chamber is fluidly connected to the second chamber by at least 3 of the first plurality of channels, and the third chamber is fluidly connected to the second chamber by at least 3 of the first plurality of channels.

4. The microfluidic device of claim 1, wherein the mixer further comprises a second plurality of channels, and each of the second plurality of channels fluidly connects a chamber of the plurality of chambers, to a reservoir, for filling the chamber, and a second plurality of channel valves, each of the second plurality of channel valves controlling fluid flow through one of the second plurality of channels.

5. The microfluidic device of claim 1, wherein the plurality of chambers further includes a fourth chamber, and the fourth chamber is fluidly connected to the second chamber by one channel of the first plurality of channels.

6. The microfluidic device of claim 1, wherein each chamber of the plurality of chambers has a volume of at most 100 nanoliters.

7. The microfluidic device of claim 1, wherein each chamber of the plurality of chambers has a volume of at most 20 nanoliters.

8. The microfluidic device of claim 1, wherein each chamber of the plurality of chambers has a volume of 0.1 to 10 nanoliters.

9. The microfluidic device of claim 4, comprising:

a fluid layer, comprising the plurality of chambers and the first plurality of channels and the second plurality of channels, and a control layer, comprising a third plurality of channels, for controlling the plurality of chamber valves, the first plurality of channel valves, and the second plurality of channel valves, wherein an elastic membrane separates the fluid layer and the control layer.

10. The microfluidic device of claim 9, wherein the elastic membrane comprises polydimethylsiloxane.

11. The microfluidic device of claim 1, further comprising at least three additional mixers.

12. The microfluidic device of claim 1, further comprising 15 additional mixers.

13. The microfluidic device of claim 1, wherein the mixer is configured to cycle material between chambers to allow for chaotic mixing of a first liquid with a second liquid.

* * * * *